(12) United States Patent
Kaneko et al.

(10) Patent No.: US 12,469,258 B2
(45) Date of Patent: Nov. 11, 2025

(54) INFERENCE PROCESSING SYSTEM IN WHICH SERVER AND EDGE DEVICE COOPERATE TO PERFORM COMPUTATION, SERVER, EDGE DEVICE, AND CONTROL METHOD THEREOF, AND STORAGE MEDIUM

(71) Applicant: CANON KABUSHIKI KAISHA, Tokyo (JP)

(72) Inventors: Hiroshi Kaneko, Kanagawa (JP); Dai Miyauchi, Chiba (JP); Ryo Ishikawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 424 days.

(21) Appl. No.: 18/164,719

(22) Filed: Feb. 6, 2023

(65) Prior Publication Data
US 2023/0274530 A1    Aug. 31, 2023

(30) Foreign Application Priority Data
Feb. 28, 2022  (JP) ................. 2022-029809

(51) Int. Cl.
*G06V 10/77*  (2022.01)
*G06N 5/04*  (2023.01)

(52) U.S. Cl.
CPC .......... *G06V 10/7715* (2022.01); *G06N 5/04* (2013.01)

(58) Field of Classification Search
None
See application file for complete search history.

(56) References Cited

U.S. PATENT DOCUMENTS

| 9,704,294 B2 | 7/2017 | Ishida et al. |
| 9,953,423 B2 | 4/2018 | Miyasa et al. |
| 10,019,811 B2 | 7/2018 | Endo et al. |
| 10,268,918 B2 | 4/2019 | Otomaru et al. |
| 11,403,841 B2 * | 8/2022 | Oda ........ G06V 10/87 |
| 2013/0222368 A1 | 8/2013 | Takama et al. |
| 2021/0334621 A1* | 10/2021 | Shimizu .......... G06N 3/088 |
| 2022/0230328 A1 | 7/2022 | Ishikawa et al. |
| 2023/0079025 A1 | 3/2023 | Tanaka et al. |
| 2023/0162059 A1* | 5/2023 | Ueda ............ G06N 3/045 706/12 |

FOREIGN PATENT DOCUMENTS

| JP | 2020-047191 A | 3/2020 |
| WO | 2018/011842 A1 | 4/2019 |

* cited by examiner

*Primary Examiner* — Thomas D Lee
(74) *Attorney, Agent, or Firm* — Carter, DeLuca & Farrell LLP

(57) ABSTRACT

An inference processing system performs computation of an inference model by a server and an edge device. Setting in the server, a server-side inference model. In the edge device, an edge-side inference model including an input layer and first to third intermediate layers of the inference model is set, and layer position information indicating a position of a last layer to process the input image in the edge-side inference model is generated. When layer data that is a computation result at the edge device obtained by performing processing from the input layer to a layer indicated by the layer position information and the layer position information is transmitted from the edge device to the server, the layer data is input to a layer subsequent to a layer indicated by the layer position information in the server-side inference model, and performs processing up to the output layer.

18 Claims, 12 Drawing Sheets

INFERENCE PROCESSING SYSTEM IN WHICH SERVER AND EDGE DEVICE COOPERATE TO PERFORM COMPUTATION, SERVER, EDGE DEVICE, AND CONTROL METHOD THEREOF, AND STORAGE MEDIUM

BACKGROUND OF THE INVENTION

Field of the Invention

The present invention relates to an inference processing system, a server, an edge device, and a control method thereof, and a storage medium. In particular, it relates to an inference processing system in which a server and an edge device cooperate to perform computation, a server, an edge device, and a control method thereof, and a storage medium.

Description of the Related Art

Conventionally, an inference processing system that performs computation with a neural network is known.

In particular, in an inference processing system that performs image recognition, the so-called convolutional neural network (CNN) is often used.

In an inference processing system using a convolutional neural network, when an input image is input to an input layer, based on the final inference result obtained by sequentially performing the processings in intermediate layers and a fully connected layer, an object included in the input image is recognized in the output layer.

In each of the intermediate layers, a plurality of feature extraction processing layers are hierarchically connected. In each feature extraction processing layer, convolution computation, activation, and pooling are performed on the input data from the previous layer. By processing the input data repeatedly in the feature extraction processing layers in this manner, the intermediate layer extracts high-dimensional feature data included in the input image.

In the fully connected layer, the computation result data of the intermediate layers are connected to obtain the final inference result. Therefore, the larger the number of intermediate layers for extracting high-dimensional feature data, the more accurate the final inference result obtained in the fully connected layer.

However, when the number of intermediate layers is increased, a device having a relatively limited computation capacity, such as an image pickup apparatus, requires an extended processing time due to the huge computational load of the inference processing performed by the neural network.

One possible solution to this problem is to transmit the input image to a server that is an external device having a relatively high computation capacity, and carry out the neural network inference in the server.

However, transmitting the input image to a server over the network has a higher security risk since privacy information included in the input image may leak as a result of a third party extracting it.

In order to solve this problem, for example, WO 2018/011842 A discloses a technique in which, when neural network learning is performed on the server, the image pickup apparatus carries out the processing of intermediate layers until it becomes difficult to recognize the features of the original input image, and then transmits the processed data to the server.

JP 2020-47191 A discloses a technique in which a deep neural network (DNN) model is divided between an image pickup apparatus and an information processing device, a feature map that does not include a person is transmitted from the image pickup apparatus to the information processing device so that personal information is protected.

However, in the techniques disclosed in WO 2018/011842 A and JP 2020-47191 A described above, up to which intermediate layer the image pickup apparatus should proceed is uniquely determined. Therefore, even when the input image contains a small amount of privacy information and the features of the input image are difficult to recognize even if the processing is stopped at an intermediate layer of a shallower hierarchical level, the processing needs to be performed up to the intermediate layer of the determined hierarchical level. That is, in such a case, the amount of computation on the image pickup apparatus side having a lower performance is unnecessarily increased, whereas the amount of computational processing on the server side having a higher performance is unnecessarily decreased. As a result, the total computation time increases.

SUMMARY OF THE INVENTION

The present invention provides an inference processing system, a server, an edge device, and a control method thereof, and a storage medium capable of maintaining the security risk low, and at the same time reducing the total computation time.

Accordingly, the inference processing system according to claim 1 of the present invention provides an inference processing system that performs, by a server and an edge device, computation of an inference model including an input layer, L intermediate layers, and an output layer, wherein the server comprises a first estimation unit that sets a server-side inference model that is the same as the inference model, and a server communication unit capable of communicating data with the edge device, and the edge device comprises a second estimation unit that sets an edge-side inference model including the input layer and first to n-th (L>n>1) intermediate layers among the L intermediate layers, an edge-side communication unit capable of communicating data with the server, and an image identification unit that detects specific information included in an input image input to an input layer of the edge-side inference model, and generates, according to the detected specific information, layer position information indicating a position of a last layer to process the input image in the edge-side inference model, wherein the edge device inputs the input image to an input layer of the edge-side inference model, and transmits layer data that is a computation result obtained by performing processing from the input layer to a layer indicated by the layer position information, and the layer position information to the server using the edge-side communication unit, and the server receives the layer data and the layer position information using the server communication unit, inputs the received layer data to a layer subsequent to a layer indicated by the received layer position information in the server-side inference model, and performs processing up to the output layer.

Accordingly, the inference processing system according to claim 7 of the present invention provides an inference processing system that performs, by a server and an edge device, computation of an inference model including an input layer, L intermediate layers, and an output layer, wherein the server comprises a first estimation unit that sets a server-side inference model that is the same as the inference model, and a server communication unit capable of communicating data with the edge device, and the edge device comprises a second estimation unit that sets an edge-side inference model including the input layer and first to n-th (L>n>1) intermediate layers among the L intermediate layers, an edge-side communication unit capable of communicating data with the server, and an image identification unit that detects specific information included in an input image input to an input layer of the edge-side inference model, and generates, according to the detected specific information, first layer position information indicating a position of a specific layer that processes the input image in the edge-side inference model, and second layer position information indicating a position of a layer that is deeper than the specific layer by i ($\geq 1$), wherein the edge device inputs the input image to an input layer of the edge-side inference model, and transmits, to the server using the edge-side communication unit, first intermediate data that is a computation result obtained by performing processing from the input layer to a layer indicated by the first layer position information, and second intermediate data that is a computation result obtained by performing processing from the input layer to a layer indicated by the second layer position information, and the server receives the first intermediate data and the second intermediate data using the server communication unit, inputs the first intermediate data to an intermediate layer at a layer position X ($1 \leq X \leq L-i$) in the server-side inference model, and acquires third intermediate data that is a computation result of an intermediate layer at a layer position X+i−1 obtained by performing processing from an intermediate layer at the layer position X to the intermediate layer at the layer position X+i−1, when the third intermediate data and the second intermediate data match, inputs the second intermediate data to an intermediate data at a layer position X+i, and performs processing from the intermediate layer at the layer position X+i to the output layer, and when the third intermediate data and the second intermediate data do not match, repeats processing of acquiring the third intermediate data again after incrementing a value of X by 1 until the third intermediate data acquired again and the second intermediate data match.

Accordingly, the server according to claim 11 of the present invention provides a server that performs computation of an inference model including an input layer, L intermediate layers, and an output layer in cooperation with an edge device in which an edge-side inference model including the input layer and first to n-th (L>n>1) intermediate layers among the L intermediate layers is set, the server comprising an estimation unit that sets a server-side inference model that is the same as the inference model, and a server communication unit capable of communicating data with the edge device, wherein, when the server receives, using the server communication unit, layer position information indicating a position of a last layer at which an input image was processed in the edge-side inference model, and layer data that is a computation result obtained when the input image is input to an input layer of the edge-side inference model and processing is performed from the input layer to a layer indicated by the layer position information, the server inputs the received layer data to a layer subsequent to a layer indicated by the received layer position information in the server-side inference model and performs processing up to the output layer.

Accordingly, the edge device according to claim 12 of the present invention provides an edge device that cooperates with a server to perform computation of an inference model including an input layer, L intermediate layers, and an output layer, the edge device comprising an estimation unit that sets an edge-side inference model including the input layer and first to n-th intermediate layers among the L intermediate layers, an edge-side communication unit capable of communicating data with the server, and an image identification unit that detects specific information included in an input image input to an input layer of the edge-side inference model, and generates, according to the detected specific information, layer position information indicating a position of a last layer to process the input image in the edge-side inference model, wherein the edge device transmits, to the server using the edge-side communication unit, layer data that is a computation result obtained when the input image is input to an input layer of the edge-side inference model and processing is performed from the input layer to a layer indicated by the layer position information, and the layer position information.

Accordingly, the server according to claim 13 of the present invention provides a server that performs computation of an inference model including an input layer, L intermediate layers, and an output layer in cooperation with an edge device in which an edge-side inference model including the input layer and first to n-th (L>n>1) intermediate layers among the L intermediate layers is set, the server comprising an estimation unit that sets a server-side inference model that is the same as the inference model, and a server communication unit capable of communicating data with the edge device, wherein, when the server receives, using the server communication unit, first intermediate data that is a computation result obtained when an input image is input to the input layer in the edge-side inference model and processing is performed from the input layer to a specific layer at which the input image was processed, and second intermediate data that is a computation result obtained when processing is performed from the input layer to a layer that is deeper than the specific layer by i ($\geq 1$), the server inputs the first intermediate data to an intermediate layer at a layer position X ($1 \leq X \leq L-i$) in the server-side inference model, and acquires third intermediate data that is a computation result of an intermediate layer at a layer position X+i−1 obtained by performing processing from an intermediate layer at the layer position X to the intermediate layer at the layer position X+i−1, when the third intermediate data and the second intermediate data match, the server inputs the computation result to an intermediate data at a layer position X+i, and performs processing from the intermediate layer at the layer position X+i to the output layer, and when the third intermediate data and the second intermediate data do not match, the server repeats processing of acquiring the third intermediate data again after incrementing a value of X by 1 until the third intermediate data acquired again and the computation result match.

Accordingly, the edge device according to claim 14 of the present invention provides an edge device that cooperates with a server to perform computation of an inference model including an input layer, L intermediate layers, and an output layer, the edge device comprising an estimation unit that sets an edge-side inference model including the input layer and first to n-th (L>n>1) intermediate layers among the L intermediate layers, an edge-side communication unit capable of communicating data with the server, and an image identification unit that detects specific information included in an input image input to an input layer of the edge-side inference model, and generates, according to the detected specific information, first layer position information indicating a position of a specific layer that processes the input image in the edge-side inference model, and second layer position information indicating a position of a layer that is deeper than the specific layer by i (≥1), wherein the edge device inputs the input image to an input layer of the edge-side inference model, and transmits, to the server using the edge-side communication unit, first intermediate data that is a computation result obtained by performing processing from the input layer to a layer indicated by the first layer position information, and second intermediate data that is a computation result obtained by performing processing from the input layer to a layer indicated by the second layer position information.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

First Embodiment

An inference processing system 1 according to a first embodiment of the present invention will be described below with reference to FIGS. 1 to 8.

Figure 1:
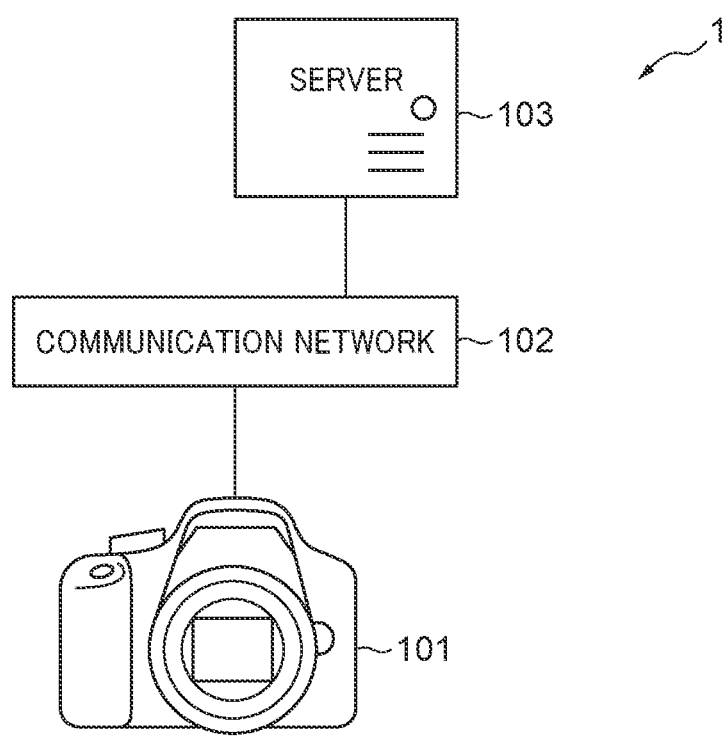
FIG. 1 is a diagram illustrating an overall configuration example of an inference processing system according to a first embodiment.

FIG. 1 is a diagram illustrating an overall configuration example of the inference processing system 1 according to the present embodiment.

The inference processing system 1 uses a neural network that executes a computation in which an input layer, a plurality of intermediate layers that extract features included in the data input from the previous layer, and an output layer are hierarchically connected. In the present embodiment, the intermediate layers are processed in a fully connected manner, but the present invention is not limited to this. In order to reduce the amount of calculation, the intermediate layers may be processed in a non-fully connected manner, and a fully connected layer may be provided immediately before the output layer.

As illustrated in FIG. 1, the inference processing system 1 includes an image pickup apparatus 101, a server 103, and a communication network 102 including a LAN, the Internet, and/or the like that connect them to each other.

The image pickup apparatus 101 and the server 103 communicate various types of information via the communication network 102. In the present embodiment, the image pickup apparatus 101 is illustrated as the edge device according to the present invention, but the present invention is not limited to this. For example, instead of the image pickup apparatus 101, a mobile phone, a tablet terminal, or the like may be applied as the edge device according to the present invention. Likewise, although the server 103 is illustrated as the server according to the present invention, the present invention is not limited to this. Specifically, any external device that has a higher computation capacity than the edge device represented by the image pickup apparatus 101 and is capable of communicating various types of information with the edge device via the communication network 102 can be applied as the server according to the present invention.

Figure 2:
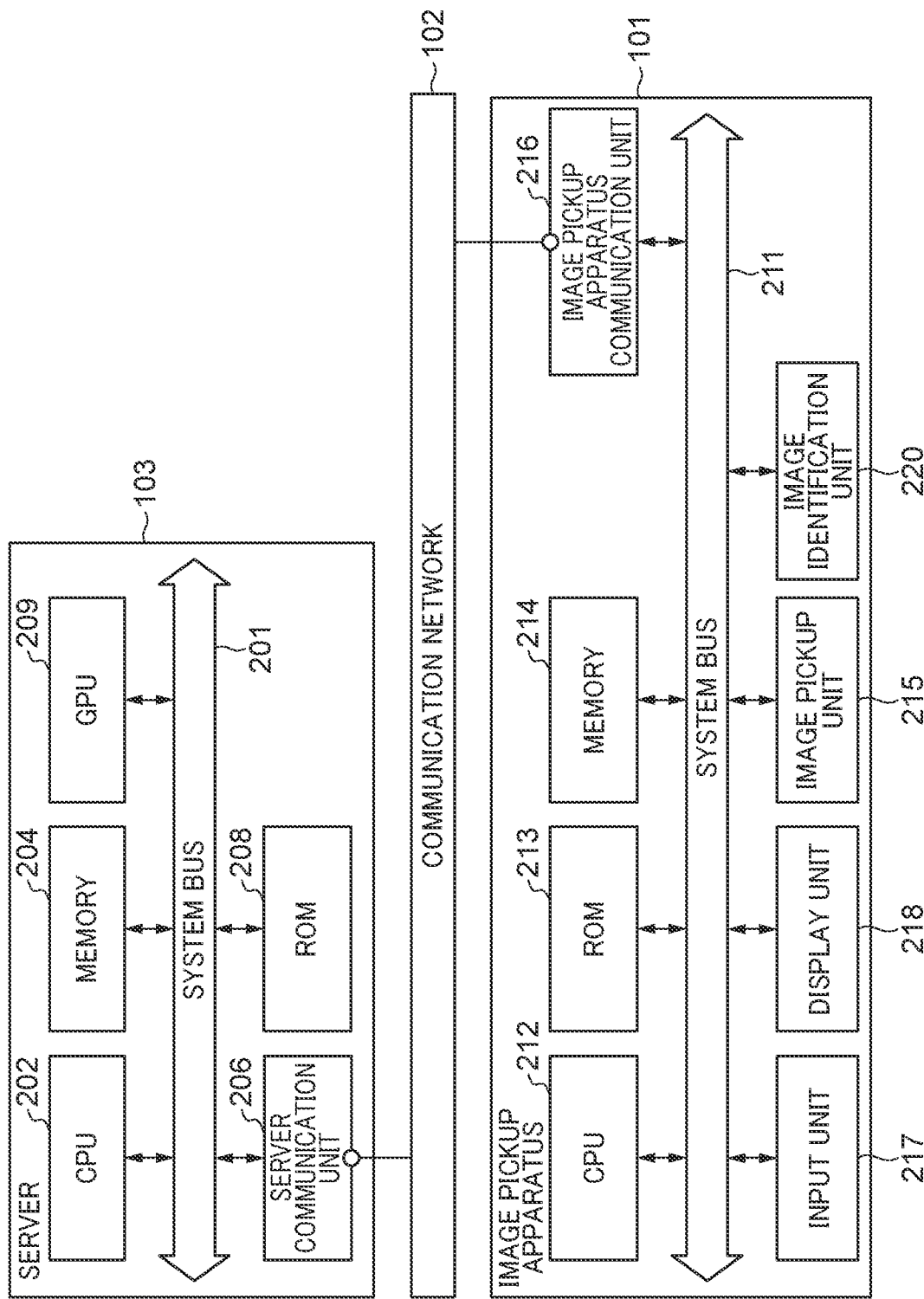
FIG. 2 is a diagram illustrating a hardware configuration example of an image pickup apparatus and a server in FIG. 1.

FIG. 2 is a diagram illustrating a hardware configuration example of the image pickup apparatus 101 and the server 103.

In the image pickup apparatus 101, a CPU 212, a ROM 213, a memory 214, a display unit 218, an input unit 217, an image identification unit 220, an image pickup unit 215, and an image pickup apparatus communication unit 216 are connected to a system bus 211. Each of the units connected to the system bus 211 is configured to be able to exchange data with each other via the system bus 211.

The ROM 213 stores various programs and the like for the CPU 212 to operate. It should be noted that the storage in which the various programs for the CPU 212 to operate are stored is not limited to the ROM 213, and may be, for example, a hard disk or the like.

The memory 214 includes, for example, a RAM, and is used as a work memory when the CPU 212 executes a program stored in the ROM 213.

The input unit 217 receives a user operation, generates a control signal according to the operation, and supplies the control signal to the CPU 212. For example, the input unit 217 includes a physical operational button, a touch panel, or the like as an input device for receiving user operation. It should be noted that a touch panel is, for example, an input device configured to output coordinate information corresponding to a position where there has been a contact with a planar input unit.

The CPU 212 controls the display unit 218, the image pickup unit 215, the image pickup apparatus communication unit 216, and the image identification unit 220 following a program and based on the control signal generated in the input unit 217 according to the user operation. As a result, it is possible to cause the display unit 218, the image pickup unit 215, the image pickup apparatus communication unit 216, and the image identification unit 220 to operate in accordance with the user operation.

The display unit 218 is, for example, a display, and includes a mechanism that outputs a display signal for displaying an image on the display. It should be noted that, in a case where the input device of the input unit 217 is a touch panel, the touch panel of the input unit 217 and the display of the display unit 218 may be integrated. For example, the touch panel is configured so that its light transmittance does not interfere with the displaying of the display, and is attached to an upper layer of the display surface of the display. Then, the input coordinates on the touch panel and the display coordinates on the display can be associated with each other.

The image pickup unit 215 includes devices such as a lens, a shutter having an aperture adjusting function, an image sensor including a CCD element, a CMOS element, or the like that converts an optical image into an electrical signal, and an image processing unit that performs various types of image processing such as exposure control and distance measurement control following a signal from the image sensor. The image pickup unit 215 generates the input image for a second estimation unit 313 (FIG. 3) to be described later by performing a series of image capturing procedures using these devices. The image pickup unit 215 can capture an image according to a user operation on the input unit 217 based on the control of the CPU 212.

The image pickup apparatus communication unit 216 (edge-side communication unit) is a communication unit capable of communicating data with the server 103 via the communication network 102 based on the control of the CPU 212.

Based on the control of the CPU 212, the image identification unit 220 detects specific information appearing in the input image generated by the image capturing in the image pickup unit 215, and outputs layer position information corresponding to the specific information. The detailed operation of the image identification unit 220 will be described later with reference to FIGS. 5 and 6.

In the server 103, a CPU 202, a ROM 208, a memory 204, a GPU 209, and a server communication unit 206 are connected to a system bus 201. Each of the units connected to the system bus 201 is configured to be able to exchange data with each other via the system bus 201.

The ROM 208 stores various programs and the like for the CPU 202 to operate. It should be noted that the storage in which the various programs for the CPU 202 to operate are stored is not limited to the ROM 208, and may be, for example, a hard disk or the like.

The memory 204 includes, for example, a RAM, and is used as a work memory of the CPU 202 and GPU 209.

The server communication unit 206 is a communication unit capable of communicating data with the image pickup apparatus 101 via the communication network 102 based on the control of the CPU 202. In the present embodiment, the CPU 202 of the server 103 generates a control signal according to an instruction received from the image pickup apparatus 101 and operates the GPU 209. The specific communication between the image pickup apparatus 101 and the server 103 will be described later with reference to FIG. 8.

The GPU 209 is a graphics processing unit, and can perform efficient computation by processing more data in parallel. When learning is to be performed a plurality of times using a learning model such as a neural network, it is effective to perform the processing using the GPU 209. In general, the GPU 209 can perform processing faster than the CPU 202 when it comes to a computation required for a neural network such as matrix operation. In the present invention, it is described that the CPU 202 and the GPU 209 are included in the server 103, but the present invention is not particularly limited to this. As described above, the present invention is applicable to any configuration in which the computation capacity of the server 103 is superior to the computation capacity of the image pickup apparatus 101. In the present embodiment, the computation capacity of the server 103 is the computation capacity of the CPU 202 and GPU 209 together, and the computation capacity of the image pickup apparatus 101 is the computation capacity of the CPU 212. The computation capacity here means how much neural network inference (corresponding to matrix computation and the like) it can process. There may be more than one GPU 209. It is also possible to use a tensor processing unit (TPU) or a neural network processing unit (NPU) instead of the GPU 209.

Figure 3:
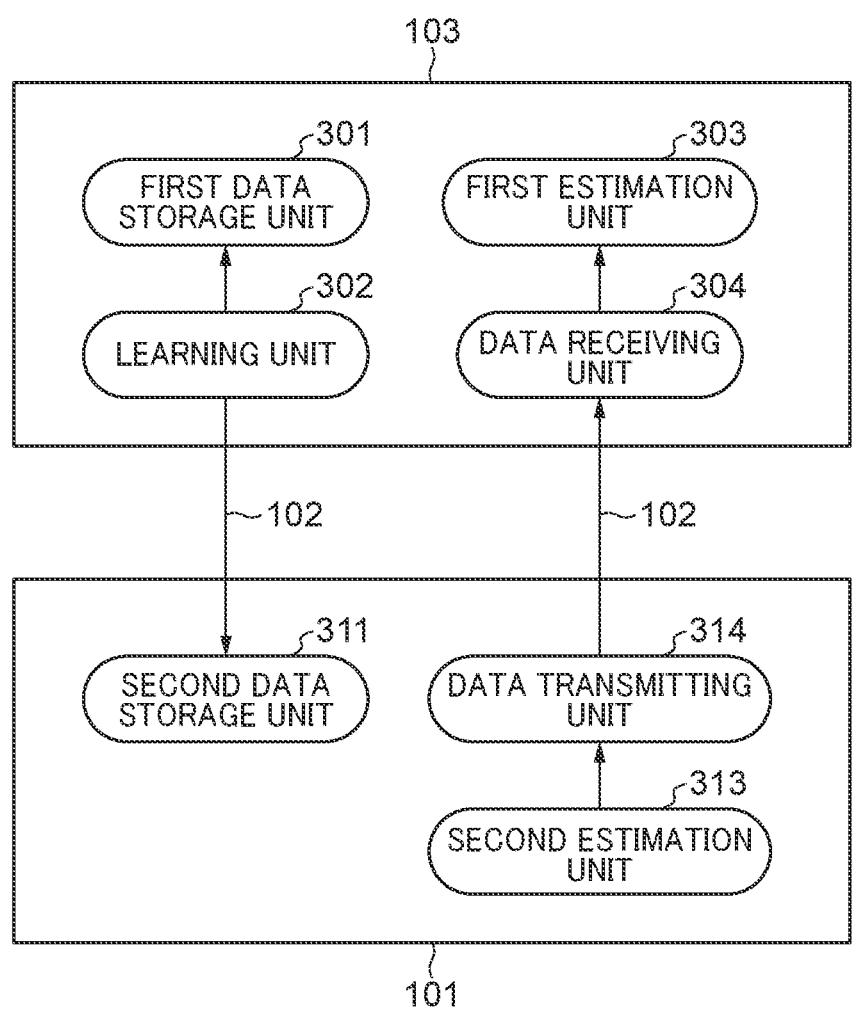
FIG. 3 is a block diagram illustrating a software configuration of the image pickup apparatus and the server.

FIG. 3 is a block diagram illustrating a software configuration of the image pickup apparatus 101 and the server 103. The image pickup apparatus 101 realizes the functions of the units thereof shown in FIG. 3 by the CPU 202 executing various control programs stored in the ROM 213 using the memory 214 as a work memory. The server 103 realizes the functions of the units thereof shown in FIG. 3 by the CPU 202 executing the various control programs stored in the ROM 208 using the memory 204 as a work memory.

The learning unit 302 learns the learning model using the CPU 202 and the GPU 209. The learning method will be described later with reference to FIG. 7.

A first data storage unit 301 stores various parameters of the learning model (hereinafter referred to as a learned model) learned by the learning unit 302 in the memory 204, a nonvolatile memory in the GPU 209, or the like. The various parameters of the learned model are, for example, connection weighting coefficients between the nodes of the neural network.

A second data storage unit 311 stores various parameters corresponding to the inference model, which is part of the learned model, possessed by the image pickup apparatus 101 in the ROM 213 or the memory 214 in advance from the server 103 via the communication network 102.

A second estimation unit 313 sets an image pickup apparatus 101-side inference model (edge-side inference model) based on the various parameters acquired from the second data storage unit 311. After that, the second estimation unit 313 inputs the input image generated by the image pickup unit 215 to the input layer of the edge-side inference model, and performs computation of the neural network forming the edge-side inference model up to the intermediate layer at a layer position indicated by the layer position information generated by the image identification unit 220.

A data transmitting unit 314 selects one of the input image generated by the image pickup unit 215 and the calculation result of the second estimation unit 313 based on the layer position information generated by the image identification unit 220. The data transmitting unit 314 transmits the selected data and the layer position information generated by the image identification unit 220 to a data receiving unit 304 via the communication network 102.

The data receiving unit 304 receives the data selected by the data transmitting unit 314 and the layer position information from the data transmitting unit 314 and inputs them to the first estimation unit 303.

The first estimation unit 303 sets a server 103-side inference model (server-side inference model) based on the various parameters acquired from the first data storage unit 301. After that, the first estimation unit 303 inputs the data selected by the data transmitting unit 314 to the layer subsequent to the layer indicated by the layer position information in the server-side inference model, performs computation of the neural network forming the server-side inference model, and outputs the inference result.

Figure 4:
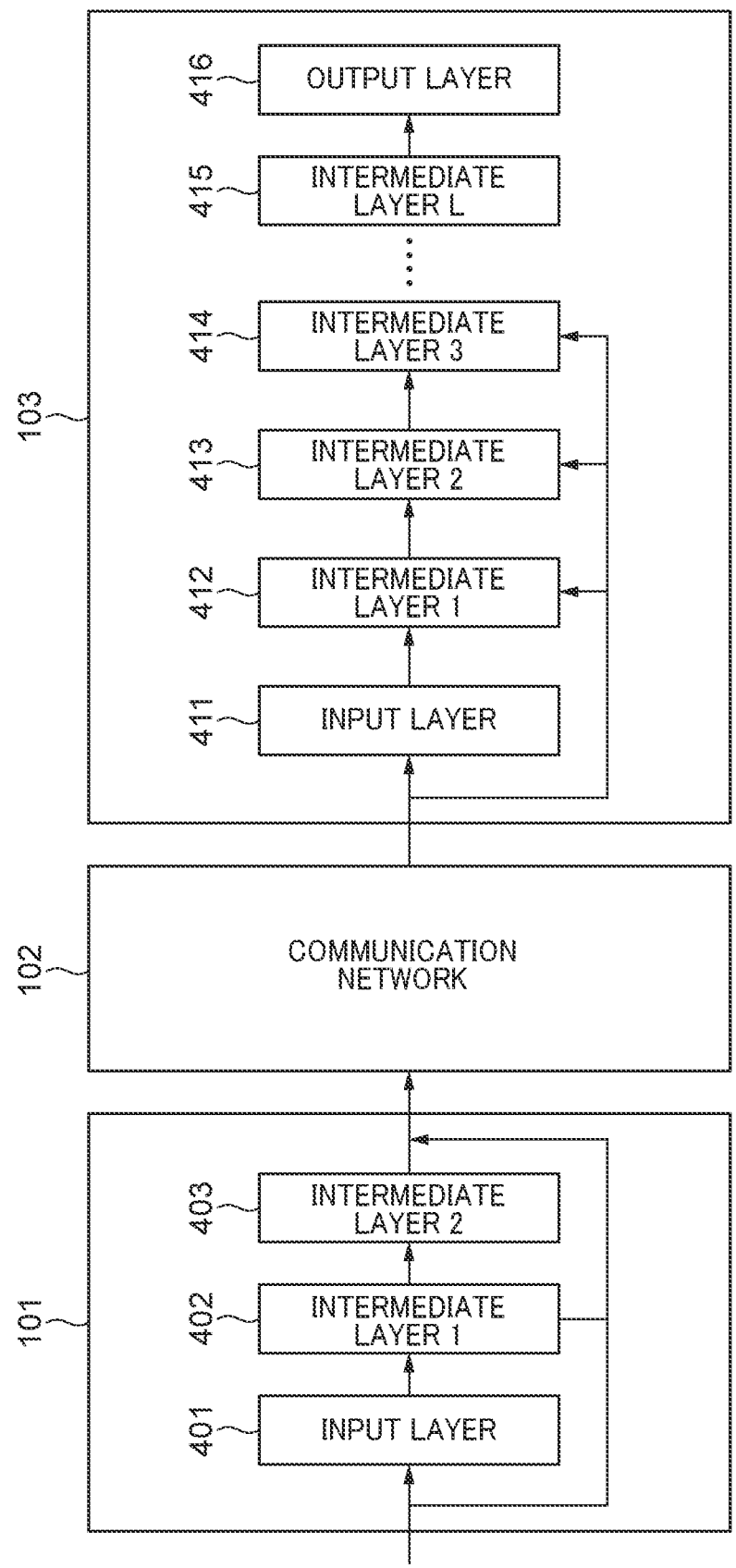
FIG. 4 is a diagram for explaining the configuration of a neural network in the inference processing system according to the first embodiment.

FIG. 4 is a diagram for explaining the configuration of the neural network in the inference processing system 1 according to the present embodiment.

The inference processing system 1 according to the present embodiment includes the edge-side inference model possessed by the image pickup apparatus 101 and the server-side inference model possessed by the server 103.

The edge-side inference model (FIG. 4) includes an input layer 401, a first intermediate layer 402 (intermediate layer 1), and a second intermediate layer 403 (intermediate layer 2). Determining which of these layers is to be processed by the edge-side inference model is realized by the CPU 212 of the image pickup apparatus 101 executing a program. Specifically, according to the layer position information generated by the image identification unit 220, the CPU 212 selects one of processing none of these layers, performing processing from the input layer 401 to the first intermediate layer 402, or performing processing from the input layer 401 to the second intermediate layer 403. After that, the CPU 212 transmits the output data (hereinafter referred to as layer data) from the inference model of the image pickup apparatus 101 according to the selection result to the server 103 via the communication network 102 together with the layer position information. It should be noted that, in a case where it is selected not to perform the processing of any of the layers of the edge-side inference model, the CPU 212 transmits the input image to the server 103 instead of the layer data.

The server-side inference model (FIG. 4) includes an input layer 411, L intermediate layers (first intermediate layer 412 (intermediate layer 1), second intermediate layer 413 (intermediate layer 2), third intermediate layer 414 (intermediate layer 3), . . . L-th intermediate layer 415 (intermediate layer L)), and an output layer 416. Determining which of these layers is to be processed by the server-side inference model is realized by the CPU 202 and GPU 209 of the server 103 executing a program. Specifically, when the layer data and the layer position information are received from the image pickup apparatus 101 via the communication network 102, the CPU 202 determines from which layer of the server-side inference model should be started processing based on the layer position information. After that, the CPU 202 inputs the layer data (or the input image) from the image pickup apparatus 101 to the determined layer of the server-side inference model, and sequentially performs the computations of the inference model of the server 103 in cooperation with the GPU 209. The CPU 202 acquires the output data from the output layer 416 as the inference result of the inference processing system according to the present invention.

The input layer 401, the first intermediate layer 402, and the second intermediate layer 403 included in the edge-side inference model are layers having functions equivalent to those of the input layer 411, the first intermediate layer 412, and the second intermediate layer 413 included in the server-side inference model.

Therefore, in a case where the CPU 212 selects not to perform the processing of any of the layers of the edge-side inference model, the input image is transmitted from the image pickup apparatus 101 to the server 103 together with the layer position information. In this case, the CPU 202 inputs the transmitted input image to the input layer 411 of the server-side inference model based on the layer position information from the image pickup apparatus 101, and performs the processing of the layers up to the output layer 416 in cooperation with the GPU 209.

In a case where the CPU 212 selects to perform processing up to the first intermediate layer 402 of the edge-side inference model, the result of processing the input image from the input layer 401 to the first intermediate layer 402 is transmitted as layer data from the image pickup apparatus 101 to the server 103 together with the layer position information. In this case, the CPU 202 inputs the transmitted layer data to the second intermediate layer 413 of the server-side inference model based on the layer position information from the image pickup apparatus 101, and performs the processing of the layers up to the output layer 416 in cooperation with the GPU 209.

Figure 5:
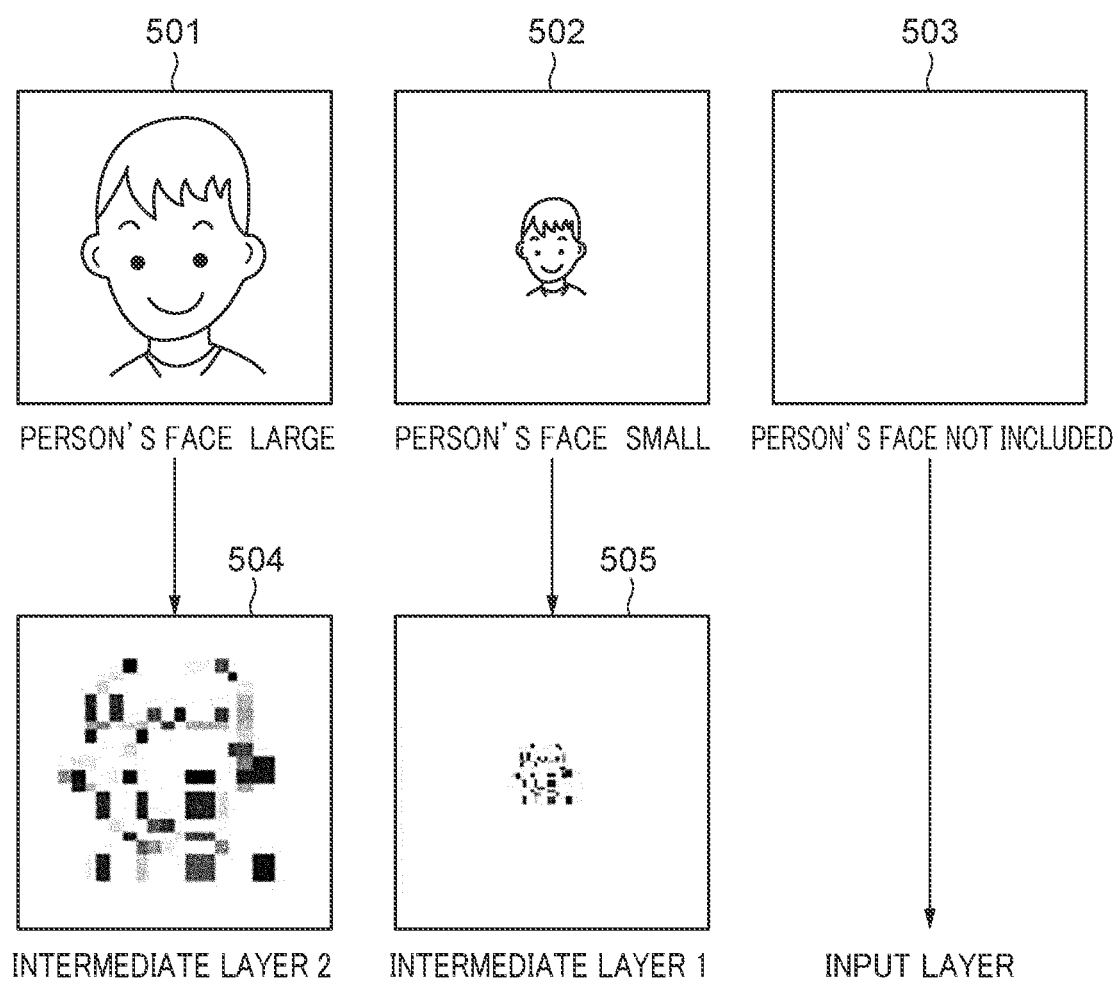
FIG. 5 is a diagram for explaining an input image according to the first embodiment.

Next, the input image according to the present embodiment will be described with reference to FIG. 5.

An image 501 includes a large image of a person's the face which is specific information according to the present embodiment.

An image 504 is an image showing a feature map obtained by sequentially computing the image 501 in the input layer 401, the first intermediate layer 402, and the second intermediate layer 403. As shown in FIG. 5, the face of the person that could be identified in the image 501 can no longer be identified in the image 504 due to blurring of the image, collapse of the contour, and the like.

It should be noted that, although a person's face is exemplified as the specific information in this embodiment, the present invention is not limited to this. For example, in a case where the specific information is character information, the computation suffices if the characters are collapsed or faded to an extent they cannot be recognized as specific character information. That is, when there is specific information that a person, a machine, or any means can identify from an input image, any known method can be applied as long as it is a method that performs computation with the edge-side inference model until the specific information becomes indistinguishable.

An image 502 includes a small image of a person's the face which is the specific information according to the present embodiment.

An image 505 is an image showing a feature map obtained by computing the image 502 in the input layer 401 and the first intermediate layer 402. As shown in FIG. 5, the face of the person that could be identified in the image 502 can no longer be identified in the image 505.

An image 503 does not include a person's the face which is the specific information according to the present embodiment.

Here, the present invention is characterized in that it switches the layer data from the edge-side inference model transmitted from the image pickup apparatus 101 to the server 103 according to the security risk of the image (input image) input to the input layer 401. Therefore, a plurality of intermediate layers are provided in the edge-side inference model in order to ensure security according to the security risk of the input image.

Further, the present invention is characterized in that, when learning processing is performed, it clarifies the intermediate layer capable of ensuring security according to the security risk of the input image. In addition, the present invention is characterized in that, when inference processing is performed, the layers to be processed with the edge-side inference model are switched based on the layer position information of the intermediate layer that can ensure security according to the security risk of the input image. Furthermore, the present invention is characterized in that, based on the layer position information, the server 103 switches the layer to which the layer data transmitted from the image pickup apparatus 101 is input in the server-side inference model, and obtains the inference result.

In the present embodiment, as will be described later in connection with the layer position information output process of FIG. 6, the security risk of the input image is determined according to the size of a person's face in the input image, but any information is applicable as long as it is information related to privacy and captured in the input image. For example, it may be a whole-body image, character information such as name and age, or biometric authentication information that can be used to identify a person, or corporate confidential information. It may also be information related to an image-capturing location where personal information or confidential information is likely to be captured. In other words, it suffices if the security risk level can be determined based on any specific information captured in the input image.

Before the layer position information output process of FIG. 6, a learning phase for creating the inference model of the inference processing system 1 on which the layer position information output process is based will be described with reference to FIG. 7.

In the present invention, learning is performed in the learning unit 302, but instead it may be performed in advance by a high-performance PC or the like. Since the layers from the input layer 411 to the output layer 416 have already been described as layers constituting the server-side inference model in FIG. 4, the description thereof is omitted.

When learning of the present embodiment is performed, in a case where an image determined to show a small image of a person's face (for example, the image 502 of FIG. 5) is input to the input layer 411 as the input image for learning, the parameters of the first intermediate layer 412 are adjusted so that a feature map (layer data for learning) from which the person cannot be identified is output. In the present embodiment, when the area the person's face occupies in the input image for learning is smaller than a ratio Ra, the image identification unit 220 determines that the person's face is small and generates layer position information for learning that indicates the first intermediate layer 412.

When learning of the present embodiment is performed, in a case where an image determined to show a large image of a person's face (for example, the image 501 of FIG. 5) is input to the input layer 411 as the input image for learning, the parameters of the second intermediate layer 413 are adjusted so that a feature map (layer data for learning) from which the person cannot be identified is output. In the present embodiment, when the area the person's face occupies in the input image for learning is equal to or larger than the ratio Ra, the image identification unit 220 determines that the person's face is large and generates layer position information for learning that indicates the second intermediate layer 413.

The inference model including the neural network including layers from the input layer 411 to the output layer 416 learns the inference model in such a configuration. As a result, it is possible to clarify the intermediate layer (the last one of the layers that process the input image in the edge-side inference model) that can ensure security according to the size (security risk) of a person's face appearing in the input image. It should be noted that, in the present embodiment, the number (n) of intermediate layers included in the image pickup apparatus 101 is two (first and second intermediate layers 412 and 413), but the number (n) of intermediate layers whose parameters are adjusted according to the security risk is not particularly limited as long as L>n>1 holds. In the present embodiment, the method of determining the security risk level of the specific information appearing in an image can be set as appropriate.

Figure 6:
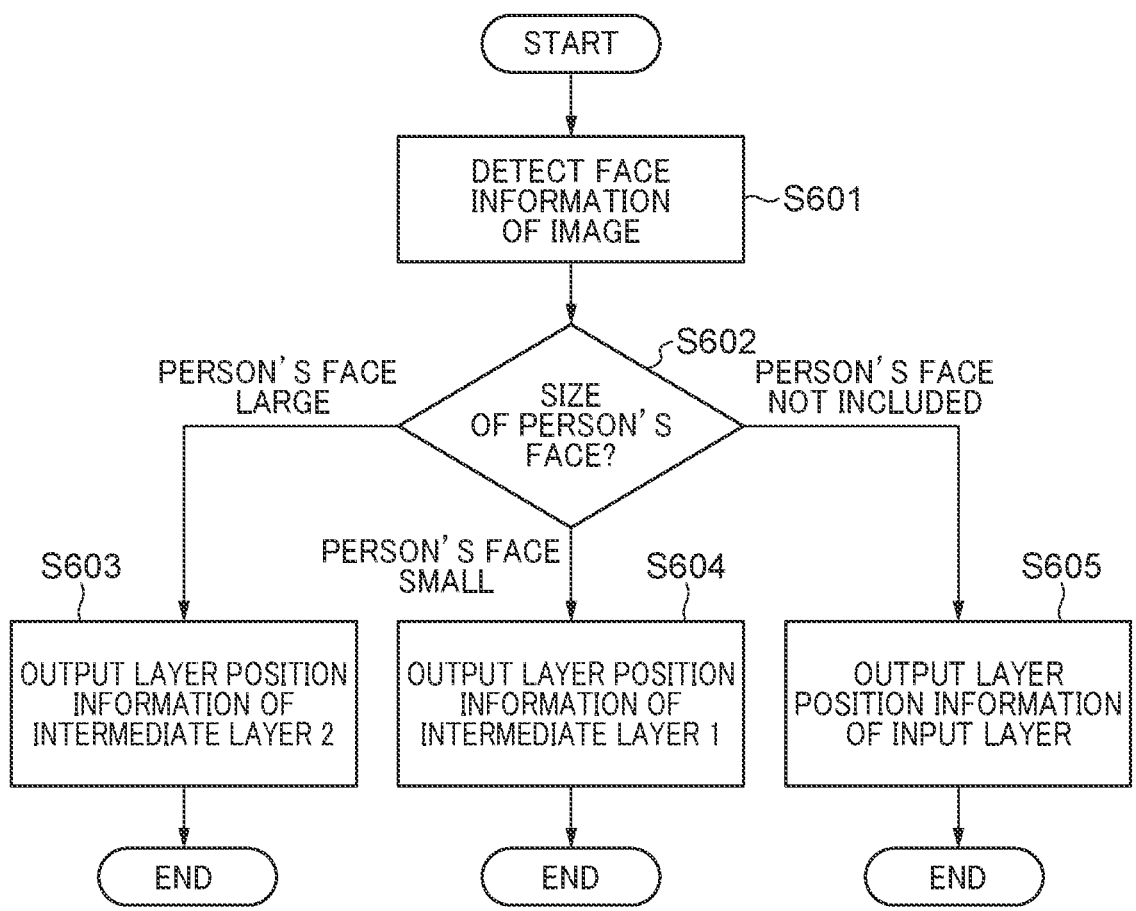
FIG. 6 is a flowchart of a layer position information output process according to the first embodiment.
Figure 7:
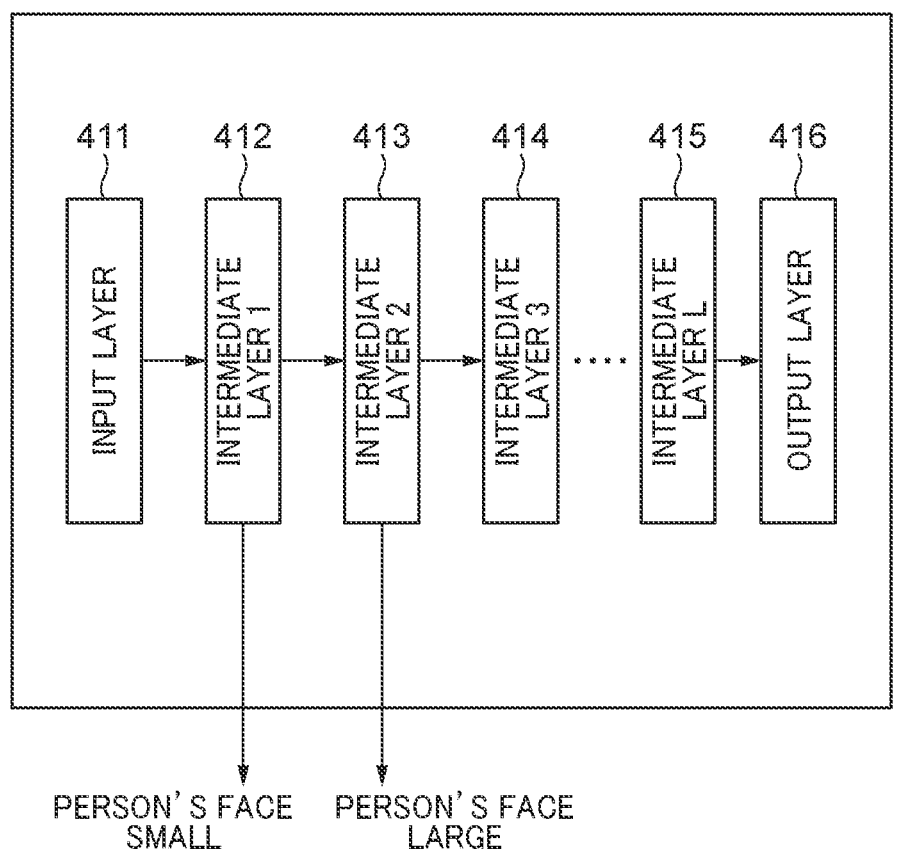
FIG. 7 is a diagram for explaining a learning phase for creating an inference model of the inference processing system of FIG. 1.

FIG. 6 is a flowchart of layer position information output process according to the present embodiment.

When the input image is input to the image identification unit 220 under the control of the CPU 212, the image identification unit 220 starts the present processing.

In step S601, the size and presence/absence of a person's face in the input image are detected, and the process proceeds to step S602.

When it is determined in step S602 that the person's face is large from the detection in step S601, the process proceeds to step S603. When it is determined that the person's face is small, the process proceeds to step S604. When it is determined that a person's face does not appear, the process proceeds to step S605.

In step S603, layer position information indicating that the intermediate layer capable of ensuring security is the second intermediate layer 403 is output to the CPU 212, and the process ends.

In step S604, layer position information indicating that the intermediate layer capable of ensuring security is the first intermediate layer 402 is output to the CPU 212, and the process ends.

In step S605, since the input image has no security risk, layer position information indicating the input layer 401 is output to the CPU 212, and the process ends.

According to this layer position information output process according to the present embodiment, the image identification unit 220 determines a layer that can ensure security according to the size of a person's face appearing in the input image, and outputs the layer position information indicating the identified layer to the CPU 212. This makes it possible to, according to the security risk of the input image and based on the layer position information output from the image identification unit 220, switch the layers processed by the image pickup apparatus 101 and the server 103 for the inference processing.

The parameters adjusted during the learning processing using the method described above with reference to FIG. 7 are set in all of the layers of the server-side inference model. In addition, among the parameters adjusted during the learning processing using the method described above with reference to FIG. 7, the parameters of the first intermediate layer 412 and the parameters of the second intermediate layer 413 are also set to the first intermediate layer 402 and the second intermediate layer 403 (FIG. 4) of the edge-side inference model. At the time of the inference processing, the layers to be processed in the edge-side inference model are switched according to the security risk of the input image and based on the result determined by the image identification unit 220 in the layer position information output process of FIG. 6. This makes it possible to switch the output data from the edge-side inference model to be transmitted to the server 103 according to the security risk of the input image. Further, based on the layer position information transmitted from the image pickup apparatus 101 to the server 103, the layer to which the output data from the edge-side inference model is input in the server-side inference model is switched. This makes it possible to output an accurate inference result from the server-side inference model while taking into consideration the security risk of the input image. As a result, it is possible to maintain the security risk low, and at the same time reduce the total computation time in the inference processing system 1. It should be noted that, in the present embodiment, the layers to be processed in the edge-side inference model are switched based on the size and presence/absence of a person's face in the input image, but the present invention is not particularly limited to this. For example, the layers to be processed in the edge-side inference model may be switched depending on the number of pieces of information or the position of the information detected from the input image, or the complexity of the information detected from the input image.

Figure 8:
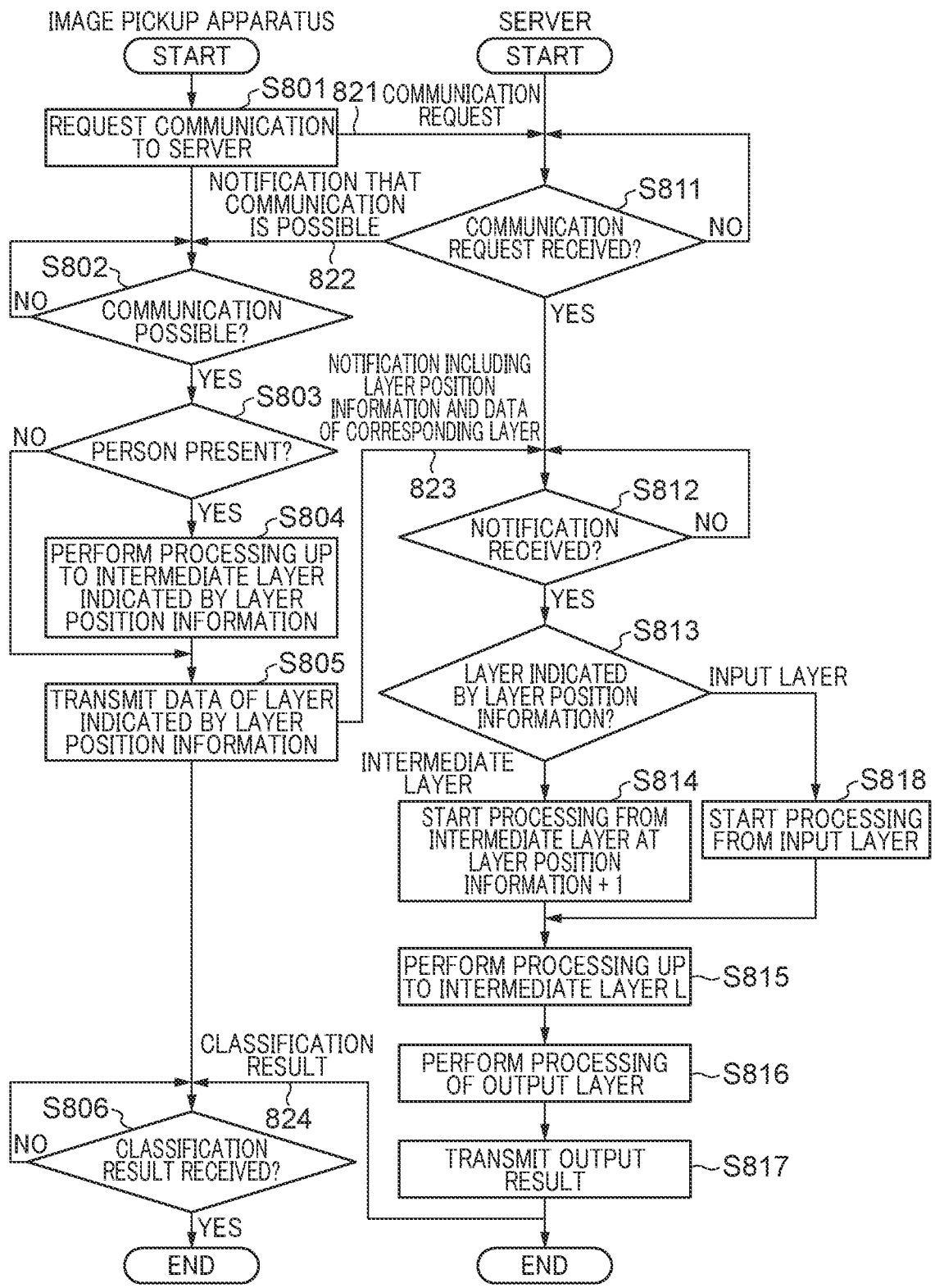
FIG. 8 is a flowchart of inference phase process according to the first embodiment.

FIG. 8 is a flowchart of inference phase process according to the present embodiment.

Steps executed by the image pickup apparatus 101 are steps S801 to S806, steps executed by the server 103 are steps S811 to S818, and notifications transmitted and received between the image pickup apparatus 101 and the server 103 are notifications 821 to 824.

First, the steps executed by the image pickup apparatus 101 will be described in detail.

In step S801, the CPU 212 of the image pickup apparatus 101 outputs the notification 821 for a communication request to the server 103 via the image pickup apparatus communication unit 216. The process then proceeds to step S802.

In step S802, the CPU 212 of the image pickup apparatus 101 waits for the notification 822 indicating that communication is possible from the server 103. When the notification 822 is received (YES in step S802), the CPU 212 of the image pickup apparatus 101 determines that it can communicate with the server 103 and proceeds to step S803.

Although it is described in the present embodiment that the CPU 212 waits for the notification 822, in practice, exceptional processing is required for when communication between the image pickup apparatus 101 and the server 103 is not established. For example, in a case where the notification 822 is not received even after waiting for a certain period of time in step S802, the process may return to step S801, and the communication request notification 821 may be output again. Further, a different known method can be applied to the method of establishing communication between the image pickup apparatus 101 and the server 103.

In step S803, the CPU 212 of the image pickup apparatus 101 inputs the image generated by the image pickup unit 215 to the image identification unit 220 as the input image, and starts the layer position information output process of FIG. 6. In the layer position information output process, the image identification unit 220 detects the presence/absence and size of a person's face in the input image, generates the layer position information indicating the identified layer that can ensure security in the edge-side inference model according to the detection results, and outputs the layer position information to the CPU 212. Specifically, when there is no person's face appearing in the input image, the image identification unit 220 outputs the layer position information of the input layer 401 to the CPU 212. When the layer position information of the input layer 401 is output from the image identification unit 220, the CPU 212 determines that there is no person appearing in the input image (NO in step S803) and proceeds to step S805. Meanwhile, when the person's face appearing in the input image is large, the image identification unit 220 outputs the layer position information of the second intermediate layer 403 to the CPU 212. When the layer position information of the second intermediate layer 403 is output from the image identification unit 220, the CPU 212 determines that there is a person appearing in the input image (YES in step S803) and proceeds to step S804. When the person's face appearing in the input image is small, the image identification unit 220 outputs the layer position information of the first intermediate layer 402 to the CPU 212. When the layer position information of the first intermediate layer 402 is output from the image identification unit 220, the CPU 212 determines that there is a person appearing in the input image (YES in step S803) and proceeds to step S804.

In step S804, the CPU 212 of the image pickup apparatus 101 causes the second estimation unit 313 to execute computation on the image (input image) generated by the image pickup unit 215 starting from the input layer 401 in the edge-side inference model to the intermediate layer indicated by the layer position information from the image identification unit 220. The process then proceeds to step S805.

In step S805, the CPU 212 of the image pickup apparatus 101 causes the image pickup apparatus communication unit 216 to transmit a notification 823 including the layer position information and the data of the result (layer data) of the computation executed in step S804 to the server 103 via the communication network 102. The process then proceeds to step S806. In a case where the answer is No in step S803 and the process proceeds to step S805, the layer data included in the notification 823 is the image generated by the image pickup unit 215 (input image).

In step S806, the CPU 212 of the image pickup apparatus 101 waits for a notification 824 including a classification result from the server 103. When the notification 824 including the classification result is received from the server 103 (YES in step S806), the CPU 212 of the image pickup apparatus 101 ends the process. It should be noted that the CPU 212 of the image pickup apparatus 101 may control the focus settings of the image pickup unit 215 based on the classification result included in the notification 824, or may add the classification result included in the notification 824 as a tag of the captured image.

Next, the steps executed by the server 103 will be described in detail.

In step S811, the CPU 202 of the server 103 waits for the communication request notification 821 from the image pickup apparatus 101 by the data receiving unit 304. When the data receiving unit 304 receives the communication request notification 821 (YES in step S811), the CPU 202 of the server 103 outputs the notification 822 indicating that communication is possible to the image pickup apparatus 101, and proceeds to step S812.

In step S812, the CPU 202 of the server 103 waits for the notification 823 including the layer position information and the layer data from the image pickup apparatus 101. When the data receiving unit 304 receives the notification 823 (YES in step S812), the CPU 202 of the server 103 proceeds to step S813.

In step S813, the CPU 202 of the server 103 determines whether the layer indicated by the layer position information included in the notification 823 indicates an intermediate layer or the input layer. When it is determined that the layer indicated by the layer position information is an intermediate layer, the process proceeds to step S814, and when the input layer is indicated, the process proceeds to step S818.

In step S814, following a command from the CPU 202 of the server 103, the GPU 209 inputs the layer data to the intermediate layer of the layer position information+1 in the server-side inference model (for example, when the layer position information indicates the first intermediate layer 402, the GPU 209 inputs the layer data to the second intermediate layer 413). After that, the GPU 209 starts computation of the server-side inference model from the intermediate layer to which the layer data has been input, and proceeds to step S815.

In step S818, the GPU 209 inputs the layer data to the input layer 411 of the server-side inference model following a command from the CPU 202 of the server 103. After that, the GPU 209 starts computation of the server-side inference model from the input layer 411, and proceeds to step S815.

In step S815, following a command from the CPU 202 of the server 103, the GPU 209 performs computation up to the L-th intermediate layer 415 of the server-side inference model shown in FIG. 3, and proceeds to step S816.

In step S816, the GPU 209 of the server 103 performs computation of the output layer 416 of the server-side inference model to acquire the layer data from the output layer 416 as the inference result of the inference processing system 1, and then proceeds to step S817. In the present embodiment, the classification result of the input image generated by the image capturing by the image pickup unit 215 is acquired as the inference result in step S816.

In step S817, the CPU 202 of the server 103 transmits the classification result acquired in step S816 to the image pickup apparatus 101 via the server communication unit 206 as the notification 824. The processing then ends.

As described above, in the present embodiment, the parameters of each intermediate layer are adjusted so as to manage the security risk of the input image when learning is performed, and, when estimation is performed, the layers to be processed in the edge-side inference model are switched according to the security risk of the input image. As a result, when the security risk of the input image is low, the number of computations carried out by the image pickup apparatus 101 can be reduced. Therefore, as compared with a system in which the intermediate layer receiving data is uniquely determined, in the present invention, the number of procedures of the image pickup apparatus 101 having low computational performance can be reduced while increasing the number of procedures of the server 103 having high computational performance. This reduces the inference processing time of the inference processing system 1 as a whole.

Second Embodiment

In the first embodiment, since the intermediate layers in which computation is performed in the edge-side inference model are switched, the notification 823 transmitted from the image pickup apparatus 101 to the server 103 needs to include not only the layer data output from the edge-side inference model but also the layer position information. However, if the communication for transmitting the notification 823 from the image pickup apparatus 101 to the server 103 is intercepted, the inference model including the layers from the input layer 411 to the output layer 416 shown in FIG. 7 may be mimicked by using the data included in the notification 823.

Therefore, an object of the present embodiment is to reduce the inference processing time of the inference processing system 1 as a whole while reducing the risk of mimicking.

An inference processing system 1' according to the present embodiment will be described below with reference to FIGS. 9 to 11. Only the processing during inference, which is the difference from the first embodiment, will be described. In addition, in the present embodiment, a case where the number of intermediate layers in the edge-side inference model is four and the layer interval between the two transmitted layer datasets is one will be described, but the number of layers and the layer interval are not limited to these. It should be noted that a case where the layer interval between two layer datasets is i (>1) will be described later with reference to FIG. 11B. Further, since the hardware configuration of the inference processing system 1' according to the present embodiment is similar to that of the inference processing system 1 according to the first embodiment, the same components are denoted by the same reference numerals, and redundant description will be omitted.

Figure 9:
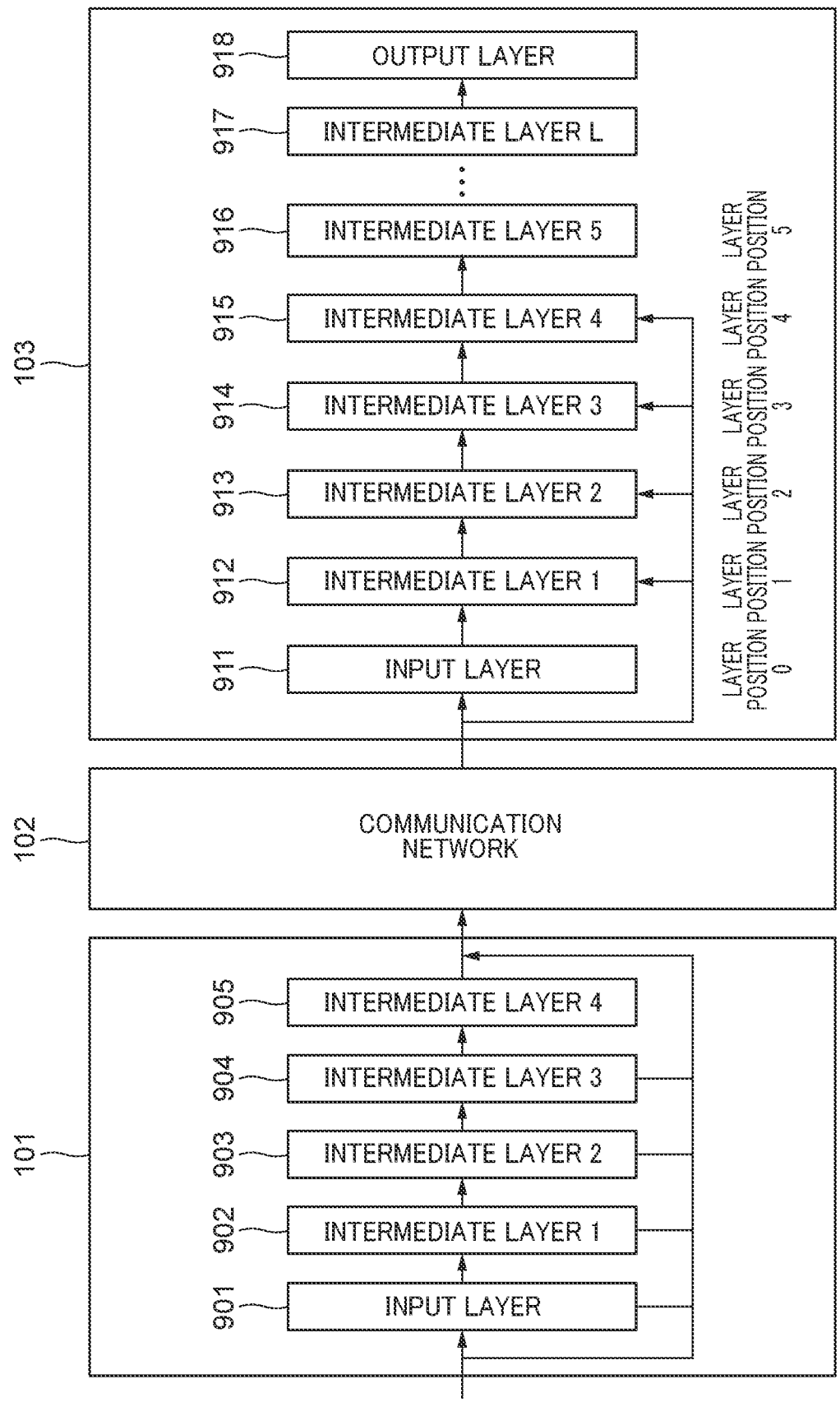
FIG. 9 is a diagram for explaining the configuration of a neural network in the inference processing system according to a second embodiment.

FIG. 9 is a diagram for explaining the configuration of the neural network in the inference processing system 1' according to the present embodiment.

The inference processing system 1' according to the present embodiment includes the edge-side inference model possessed by the image pickup apparatus 101 and the server-side inference model possessed by the server 103.

The edge-side inference model (FIG. 9) includes an input layer 901, a first intermediate layer 902 (intermediate layer 1), a second intermediate layer 903 (intermediate layer 2), a third intermediate layer 904 (intermediate layer 3), and a fourth intermediate layer 905 (intermediate layer 4). Which of these layers the edge-side inference model processes is realized by the CPU 212 of the image pickup apparatus 101 executing a program. Specifically, the CPU 212 determines which two layers of the edge-side inference model should be processed based on the layer position information from the image identification unit 220, and acquires layer data from the selected two layers.

After that, the CPU 212 inputs the acquired two layer datasets to the server 103 via the communication network 102. The one of the two datasets from the shallower layer position is referred to as the first intermediate data, and the one from the deeper layer position is referred to as the second intermediate data. The second intermediate data may be data of all the nodes in the layer specified by the image identification unit 220, or may be part of the data, and is not particularly limited.

The server-side inference model (FIG. 9) includes an input layer 911, L intermediate layers (first intermediate layer 912 (intermediate layer 1), second intermediate layer 913 (intermediate layer 2), third intermediate layer 914 (intermediate layer 3), fourth intermediate layer 915, fifth intermediate layer 916, . . . L-th intermediate layer 917 (intermediate layer L)), and an output layer 918.

The CPU 202 of the server 103 inputs the first intermediate data to each of the layers (911 to 915) in the server-side inference model equivalent to the layers in the edge-side inference mode, and performs the processing of each layer to which the data has been input in cooperation with the GPU 209. After that, the output data from each of the layers to which the data has been input is compared with the second intermediate data. The processing of the subsequent layers are performed only when the output data and the second intermediate data match. For example, in the example of FIG. 9, from the image pickup apparatus 101 to the server 103, the output data from the third intermediate layer 904 is input as the first intermediate data and the output data from the fourth intermediate layer 905 is input as the second intermediate data. Therefore, when the first intermediate data is input to the fourth intermediate layer 915 and processed, the output data matches the second intermediate data. In this case, the second intermediate data is input to the fifth intermediate layer 916, and the processing of the subsequent layers is performed up to the output layer 918. It should be noted that the comparison between the output data from each of the layers of the server-side inference model and the second intermediate data is realized by the CPU 202 and the GPU 209 of the server 103 executing a program.

That is, a difference between the present embodiment and the first embodiment resides in the data transmitted from the image pickup apparatus 101 to the server 103. Specifically, in the first embodiment, the notification 823 including the layer data and data of layer position information is transmitted from the image pickup apparatus 101 to the server 103. On the other hand, in the present embodiment, two layer datasets (first and second intermediate data) are transmitted from the image pickup apparatus 101 to the server 103. Therefore, in the present embodiment, the server 103 further performs processing for determining the layer in the server-side inference model to which the second intermediate data is input based on the two layer datasets.

Figure 10:
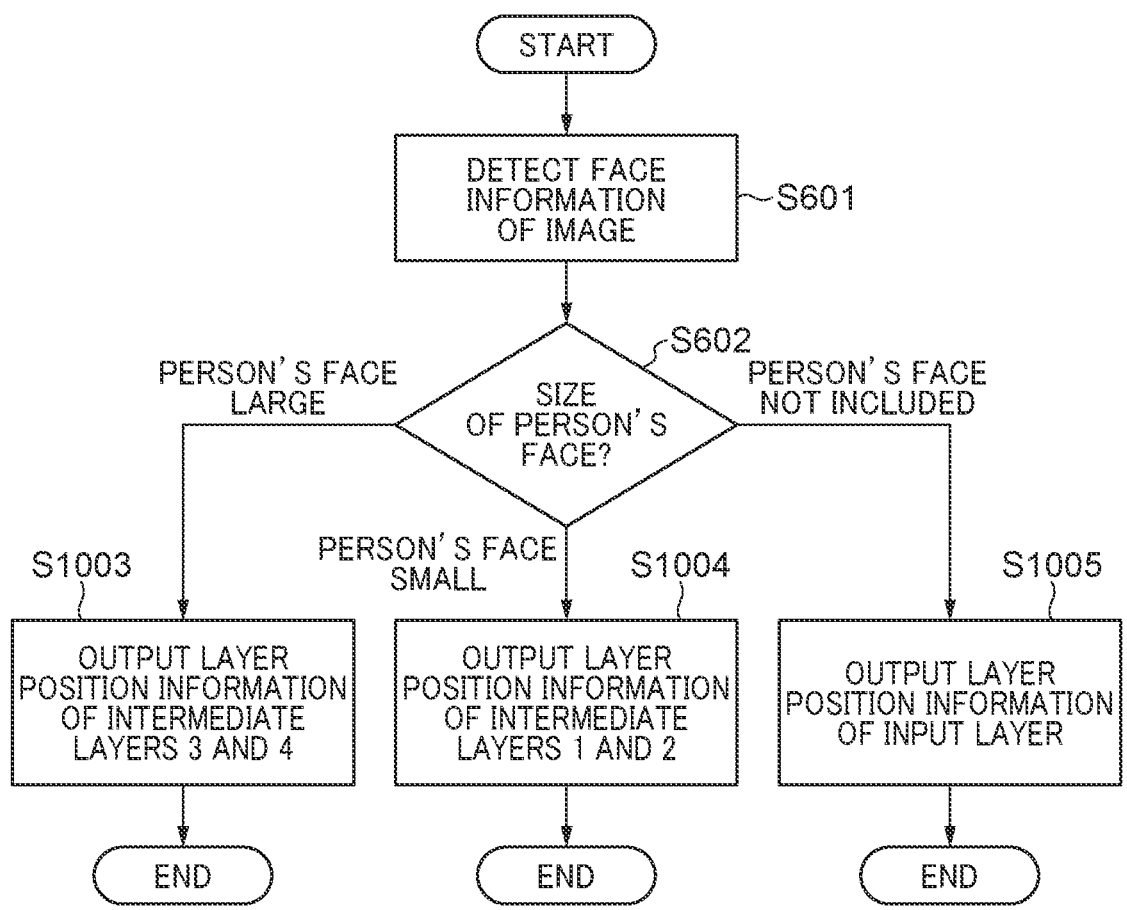
FIG. 10 is a flowchart of a layer position information output process according to the second embodiment.

FIG. 10 is a flowchart of the layer position information output process according to the present embodiment.

As with the processing shown in FIG. 6, when the input image is input to the image identification unit 220 under the control of the CPU 212, the image identification unit 220 starts the present processing. The same steps as those in the flowchart of FIG. 6 will be denoted by the same reference numerals, and redundant description will be omitted.

The processing of steps S601 to S602 is carried out. When it is determined in step S602 that the person's face is large from the detection in step S601, the process proceeds to step S1003. When it is determined that the person's face is small, the process proceeds to step S1004. When it is determined that a person's face does not appear, the process proceeds to step S1005.

In step S1003, first layer position information indicating that the intermediate layer (specific layer) capable of ensuring security is the third intermediate layer 904, and second layer position information indicating the immediately preceding (the layer that is deeper by one) intermediate layer (the fourth intermediate layer 905) are output to the CPU 212, and this process ends.

In step S1004, first layer position information indicating that the intermediate layer capable of ensuring security is the first intermediate layer 902, and second layer position information indicating the immediately preceding intermediate layer (the second intermediate layer 903) are output to the CPU 212, and this process ends.

In step S1005, since the input image has no security risk, first layer position information indicating the input layer 901 is output to the CPU 212, and the process ends.

According to this layer position information output process according to the present embodiment, the image identification unit 220 determines a layer that can ensure security according to the size of a person's face appearing in the input image. Then, the image identification unit 220 generates first layer position information indicating the determined layer and second layer position information indicating an intermediate layer one ahead of the first layer position information, and outputs the first layer position information and the second layer position information to the CPU 212. Therefore, the CPU 212 performs processing up to the two layer positions indicated by the first and second pieces of layer position information, and transmits the acquired two layer datasets to the server 103. However, in a case where the image identification unit 220 outputs the first layer position information indicating the input layer to the CPU 212, the CPU 212 transmits the output data from the input layer 901 and the input image to the server 103. This makes it possible to switch the layers processed by the image pickup apparatus 101 and the server 103 for estimation according to the security risk of the input image without transmitting the first layer position information indicating the layer capable of ensuring security from the image pickup apparatus 101 to the server 103.

Figure 11A:
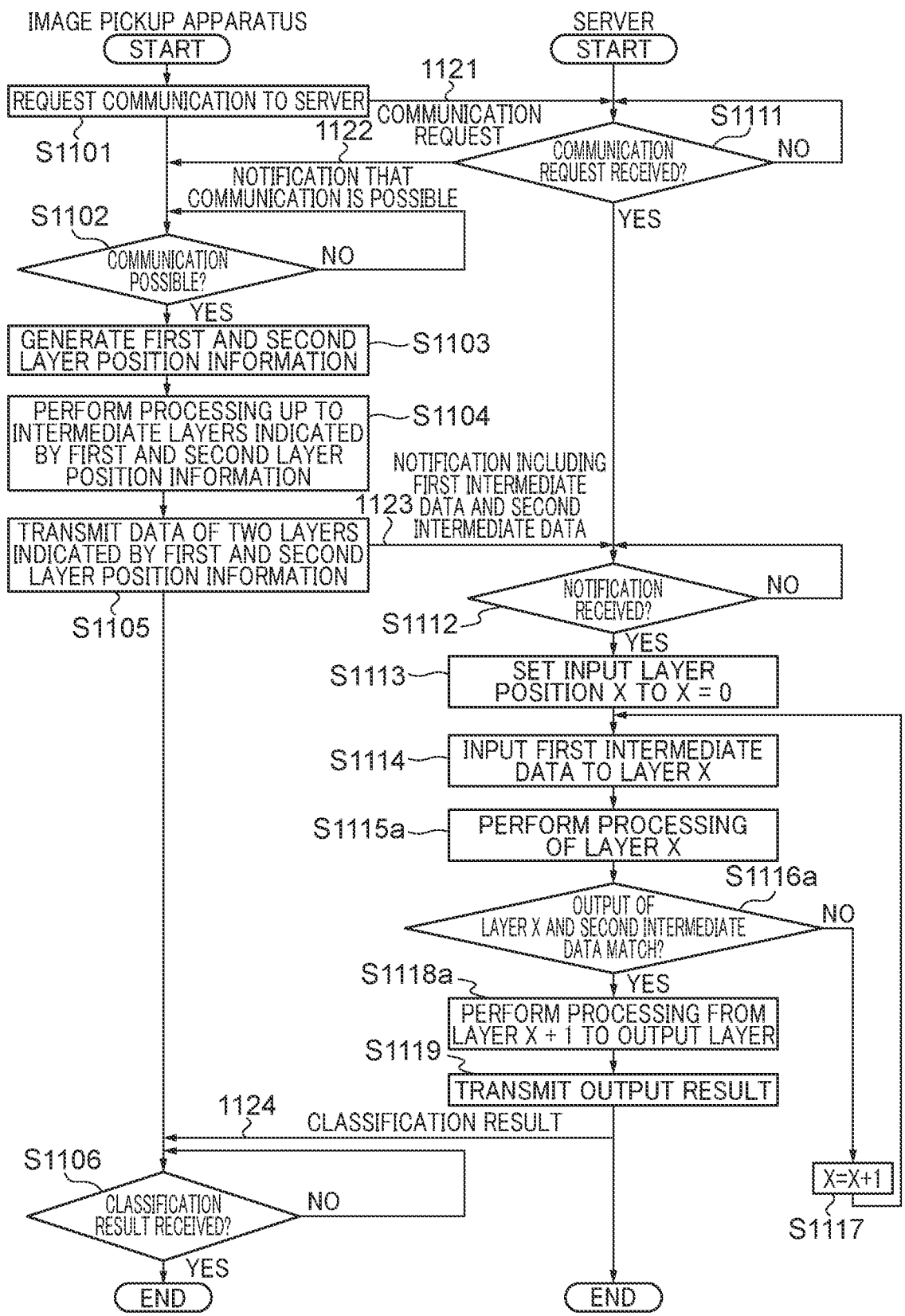
FIG. 11A is a flowchart of inference phase process according to the second embodiment when the layer interval is 1.
Figure 11B:
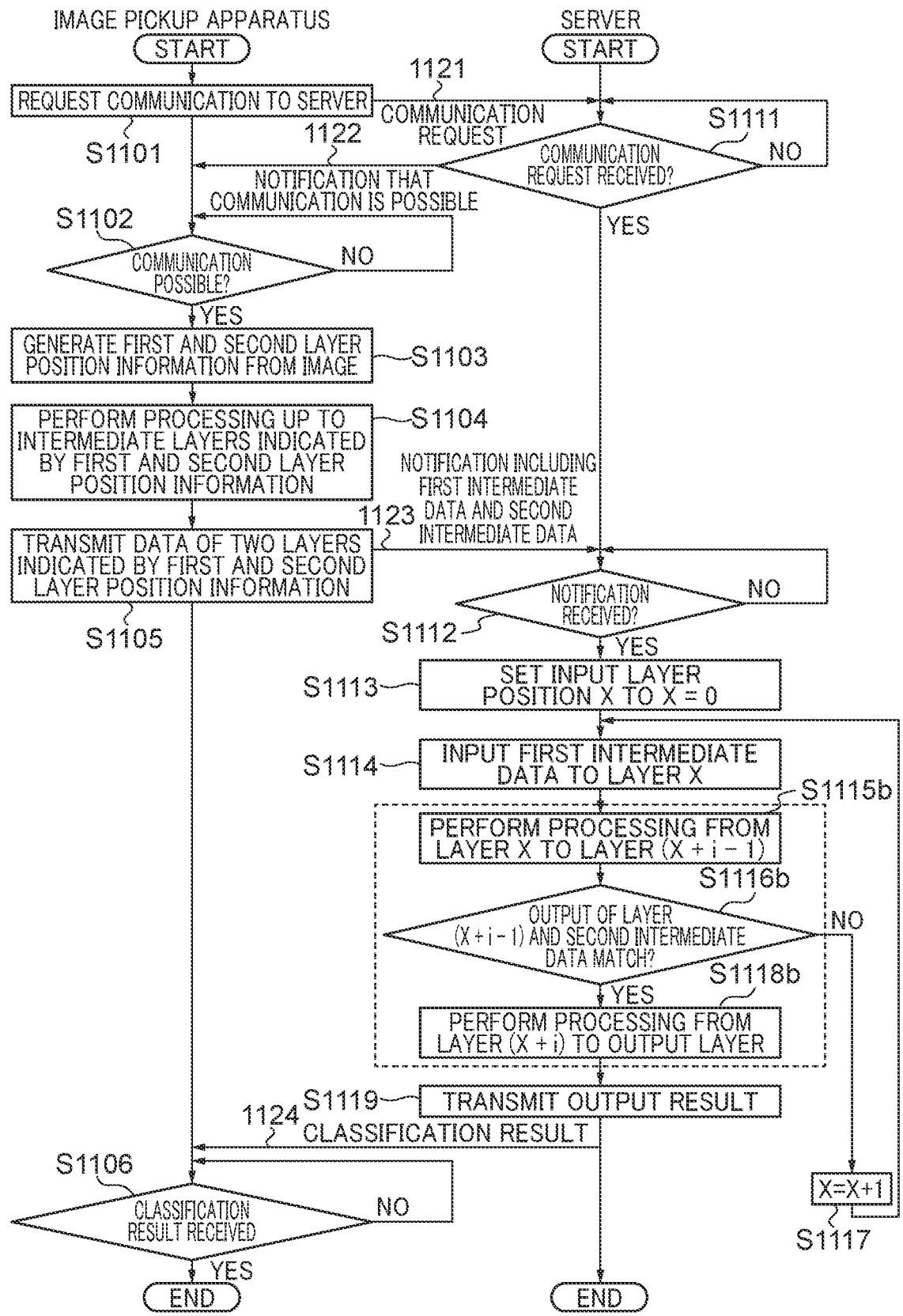
FIG. 11B is a flowchart of the inference phase process according to the second embodiment when the layer interval is i (>1).

FIGS. 11A and 11B are each a flowchart of inference phase process according to the present embodiment.

First, a case where the layer interval is one will be described with reference to FIG. 11A.

Steps executed by the image pickup apparatus 101 are steps S1101 to S1106, steps executed by the server 103 are steps S1111 to S1119, and notifications transmitted and received between the image pickup apparatus 101 and the server 103 are notifications 1121 to 1124.

First, the steps executed by the image pickup apparatus 101 will be described in detail.

In step S1101, the CPU 212 of the image pickup apparatus 101 outputs the notification 1121 for a communication request to the server 103 via the image pickup apparatus communication unit 216. The process then proceeds to step S1102.

In step S1102, the CPU 212 of the image pickup apparatus 101 waits for the notification 1122 indicating that communication is possible from the server 103. When the notification 1122 is received (YES in step S1102), the CPU 212 of the image pickup apparatus 101 determines that it can communicate with the server 103 and proceeds to step S1103.

Similarly to step S802 in the first embodiment, also in step S1102 of the present embodiment, when the notification 1122 is not received even after waiting for a certain period of time, the process may return to step S1101, and the notification 1121 may be output again. Further, a different known method can be applied to the method of establishing communication between the image pickup apparatus 101 and the server 103.

In step S1103, the CPU 212 of the image pickup apparatus 101 inputs the image generated by the image pickup unit 215 to the image identification unit 220 as the input image, and starts the layer position information output process of FIG. 10. In the layer position information output process, the image identification unit 220 detects the presence/absence and size of a person's face in the input image, generates the first and second pieces of layer position information according to the detection results, and outputs them to the CPU 212. The process then proceeds to step S1104.

In step S1104, the CPU 212 of the image pickup apparatus 101 performs computation of the edge-side inference model on the input image based on the first and second pieces of layer position information. Specifically, the CPU 212 of the image pickup apparatus 101 executes the computation from the input layer of the edge-side inference model to the layer indicated by the first layer position information, and acquires the first intermediate data. Likewise, the CPU 212 of the image pickup apparatus 101 executes the computation from the input layer of the edge-side inference model to the layer indicated by the second layer position information, and acquires the second intermediate data. The process then proceeds to step S1105.

In step S1105, the CPU 212 of the image pickup apparatus 101 communicates the notification 1123 including the data of the first and second intermediate datasets acquired in step S1104 to the server 103, and proceeds to step S1106. However, the second intermediate data may be data of all the nodes of the specified layer, or may be data of part of the nodes, and is not particularly limited.

In step S1106, the CPU 212 of the image pickup apparatus 101 waits for a notification 1124 including a classification result from the server 103. When the notification 1124 including the classification result is received from the server 103 (YES in step S1106), the CPU 212 of the image pickup apparatus 101 ends the process. It should be noted that, as in the first embodiment, the CPU 212 of the image pickup apparatus 101 may control the focus settings of the image pickup unit 215 based on the classification result included in the notification 1124, or may add the classification result included in the notification 1124 as a tag of the captured image.

Next, the steps executed by the server 103 will be described in detail.

In step S1111, the CPU 202 of the server 103 waits for the communication request notification 1121 from the image pickup apparatus 101 by the data receiving unit 304. When the data receiving unit 304 receives the notification 1121 (YES in step S1111), the CPU 202 of the server 103 outputs the notification 1122 indicating that communication is possible to the image pickup apparatus 101, and proceeds to step S1112.

In step S1112, the CPU 202 of the server 103 waits for the notification 1123 including the first and second pieces of layer position information from the image pickup apparatus 101. When the data receiving unit 304 receives the notification 1123 (YES in step S1112), the CPU 202 of the server 103 proceeds to step S1113.

In step S1113, the CPU 202 of the server 103 sets a layer position X at which the first intermediate data included in the notification 1123 is input to the server-side inference model to 0 (input layer 911), and proceeds to step S1114.

In step S1114, the CPU 202 of the server 103 inputs the first intermediate data to the layer at the layer position X in the server-side inference model, and proceeds to step S1115a.

In step S1115a, following a command from the CPU 202 of the server 103, the GPU 209 performs the computation of the layer at the layer position X to which the first intermediate data has been input. After acquiring the output result (third intermediate data) from the layer at the layer position X, the CPU 202 of the server 103 proceeds to step S1116a.

In step S1116a, the CPU 202 of the server 103 compares the third intermediate data acquired in step S1115a with the second intermediate data. As a result of the comparison, when they do not match with each other (NO in step S1116a), the process proceeds to step S1117, and when they match with each other (YES in step S1116a), the process proceeds to step S1118a.

In step S1117, the CPU 202 of the server 103 moves behind the layer position X to which the first intermediate data is input in the server-side inference model by one (increments the value of X by one), and returns to step S1114. That is, the output result (third intermediate data) from the layer at the layer position X is acquired again, and the processing starting from step S1114 is repeated until the output result from the layer at the layer position X acquired again matches the second intermediate data.

In step S1118a, following a command from the CPU 202 of the server 103, the GPU 209 enters the second intermediate data to the layer at the layer position X+1, and performs the computation of the server-side inference model from the layer position X+1 to the output layer 918. The CPU 202 of the server 103 acquires the output data from the output layer 918 as the inference result of the inference processing system 1' according to the present invention, and proceeds to step S1119. In the present embodiment, the classification result of the input image generated by the image capturing by the image pickup unit 215 and included in the notification 1124 is acquired as the inference result in step S1118a.

In step S1119, the CPU 202 of the server 103 transmits the classification result acquired in step S1118a to the image pickup apparatus 101 via the server communication unit 206 as the notification 1124. The processing then ends.

It should be noted that, although not illustrated in FIG. 11A, in a case where X=L holds after incrementing the value of X by one in step S1117, the processing is terminated. In other words, this processing is performed in the range of $1 \leq X \leq L-1$.

Next, with reference to FIG. 11B, the difference between the inference processing when the layer interval is i and the inference processing when the layer interval is 1 described above using FIG. 11A will be described. In FIG. 11B, the same steps as those in FIG. 11A are denoted by the same reference numerals, and redundant description will be omitted.

In the case where the layer interval is 1 (FIG. 11A), when the first intermediate data is input to the layer at the layer position X in the server-side inference model and the computation processing of the layer at the layer position X is performed, the output result (third intermediate data) from the layer position X and the second intermediate data are compared. As a result of this comparison, when they match with each other, the second intermediate data is input to the layer at the layer position X+1, and the computation processing was performed from the layer at the layer position X+1 to the output layer 918.

On the other hand, in the case where the layer interval is i (FIG. 11B), when the first intermediate data is input to the layer at the layer position X in the server-side inference model in step S1114, the process proceeds to step S1115b, and the computation processing is performed from the layer at the layer position X to the layer at the layer position (X+i−1). Next, in step S1116b, the output result (third intermediate data) from the layer at the layer position (X+i−1) is compared with the second intermediate data. As a result of this comparison, when they match with each other, the process proceeds to step S1118b, and when they do not match with each other, as in the case where the layer interval is 1, the process returns to step S1114 after incrementing the value of X by one in step S1117. In step S1118b, the second intermediate data is input to the layer at the layer position (X+i), and the computation processing is performed from the layer at the layer position (X+i) to the output layer 918.

It should be noted that, although not illustrated in FIG. 11B, in a case where X=L−i+1 holds after incrementing the value of X by one in step S1117, the processing is terminated. In other words, this processing is performed in the range of $1 \leq X \leq L-i$.

The case where the layer interval is i has been described, but when i=1, naturally, the flowchart of FIG. 11B is equivalent to the flowchart of FIG. 11A.

As described above, according to the present embodiment, the layer data from the edge-side inference model transmitted from the image pickup apparatus 101 to the server 103 is switched according to the specific information appearing in the input image when estimation performed. As a result, the processing time can be reduced as compared with an inference processing system in which the layers to be processed by the image pickup apparatus 101 and the server 103 are uniquely determined. Further, in the first embodiment, since not only the layer data but also the layer position information is transmitted from the image pickup apparatus 101 to the server 103, there is a risk that the inference model may leak. On the other hand, in the present embodiment, since two layer datasets are transmitted from the image pickup apparatus 101 to the server 103 instead of the layer position information, the risk of the inference model leaking can be reduced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC) and field programmable gate array (FPGA)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU), graphics processing unit (GPU), digital signal processor (DSP), data flow processor (DFP), or neural processing unit (NPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-029809, filed Feb. 28, 2022 which is hereby incorporated by reference herein in its entirety.

What is claimed is:

1. An inference processing system that performs, by a server and an edge device, computation of an inference model including an input layer, L intermediate layers, and an output layer,
wherein the inference processing system comprises:
at least one processor; and
at least one memory having stored thereon instructions which, when executed by the at least one processor, cause the inference processing system at least to:
set, by the server, a server-side inference model that is the same as the inference model;
communicate, by the server, data with the edge device;
set, by the edge device, an edge-side inference model including the input layer and first to n-th (L>n>1) intermediate layers among the L intermediate layers;
communicate, by the edge device, data with the server; and
detect, by the edge device, specific information included in an input image input to an input layer of the edge-side inference model, and generate, according to the detected specific information, layer position information indicating a position of a last layer to process the input image in the edge-side inference model,
wherein the edge device inputs the input image to an input layer of the edge-side inference model, and transmits layer data that is a computation result obtained by performing processing from the input layer to a layer indicated by the layer position information, and the layer position information to the server, and
the server receives the layer data and the layer position information, inputs the received layer data to a layer subsequent to a layer indicated by the received layer position information in the server-side inference model, and performs processing up to the output layer.

2. The inference processing system according to claim 1, wherein
the edge device
sets the position of the last layer to a deeper layer position as an amount of the specific information included in the input image increases, and
sets the position of the last layer to a shallower layer position as the amount of the specific information included in the input image decreases.

3. The inference processing system according to claim 1, wherein the layer data is a computation result from which a fact that the specific information is included in the input image cannot be determined.

4. The inference processing system according to claim 1, wherein
in learning for determining a parameter of the inference model,
a parameter of the specific intermediate layer is adjusted to obtain computation processing that makes the specific information unidentifiable from a computation result of a specific intermediate layer according to an amount of the specific information included in an input image for learning.

5. The inference processing system according to claim 4, wherein
the specific intermediate layer is one of the first to n-th intermediate layers, and, the larger the amount of the specific information included in the input image for learning, the deeper a layer position of the specific intermediate layer, and the smaller the amount of the specific information included in the input image for learning, the shallower the layer position of the specific intermediate layer.

6. The inference processing system according to claim 5, wherein,
when the specific information is not detected from the input image, the edge device sets a position of a layer indicated by the layer position information to a position of the input layer,
when the layer position information indicates a position of the input layer, the edge device transmits the input image and the layer position information to the server, and
when the server receives the input image and the layer position information, the server inputs the received input image to an input layer indicated by the received layer position information, and performs processing up to the output layer.

7. An inference processing system that performs, by a server and an edge device, computation of an inference model including an input layer, L intermediate layers, and an output layer, wherein the inference processing system comprises:
   at least one processor; and
      at least one memory having stored thereon instructions which, when executed by the at least one processor, cause the inference processing system at least to:
   set, by the server, a server-side inference model that is the same as the inference model; and
   communicate, by the server, data with the edge device;
   set, by the edge device, an edge-side inference model including the input layer and first to n-th (L>n>1) intermediate layers among the L intermediate layers;
   communicate, by the edge device, data with the server; and
   detect, by the edge device, specific information included in an input image input to an input layer of the edge-side inference model, and generate, according to the detected specific information, first layer position information indicating a position of a specific layer that processes the input image in the edge-side inference model, and second layer position information indicating a position of a layer that is deeper than the specific layer by i (≥1),
   wherein the edge device inputs the input image to an input layer of the edge-side inference model, and transmits, to the server, first intermediate data that is a computation result obtained by performing processing from the input layer to a layer indicated by the first layer position information, and second intermediate data that is a computation result obtained by performing processing from the input layer to a layer indicated by the second layer position information, and
   the server
   receives the first intermediate data and the second intermediate data, inputs the first intermediate data to an intermediate layer at a layer position X (1≤X≤L−i) in the server-side inference model, and acquires third intermediate data that is a computation result of an intermediate layer at a layer position X+i−1 obtained by performing processing from an intermediate layer at the layer position X to the intermediate layer at the layer position X+i−1,
   when the third intermediate data and the second intermediate data match, inputs the second intermediate data to an intermediate data at a layer position X+i, and performs processing from the intermediate layer at the layer position X+i to the output layer, and
   when the third intermediate data and the second intermediate data do not match, repeats processing of acquiring the third intermediate data again after incrementing a value of X by 1 until the third intermediate data acquired again and the second intermediate data match.

8. The inference processing system according to claim 1, wherein
   the specific information is information related to an image-capturing location.

9. The inference processing system according to claim 1, wherein
   the specific information is privacy-related information.

10. The inference processing system according to claim 9, wherein
   the specific information is information on a size of a human face detected from the input image by the edge device.

11. A server that performs computation of an inference model including an input layer, L intermediate layers, and an output layer in cooperation with an edge device in which an edge-side inference model including the input layer and first to n-th (L>n>1) intermediate layers among the L intermediate layers is set, the server comprising:
   at least one processor; and
      at least one memory having stored thereon instructions which, when executed by the at least one processor, cause the server at least to:
   set a server-side inference model that is the same as the inference model; and
   communicate data with the edge device,
   wherein, when the server receives layer position information indicating a position of a last layer at which an input image was processed in the edge-side inference model, and layer data that is a computation result obtained when the input image is input to an input layer of the edge-side inference model and processing is performed from the input layer to a layer indicated by the layer position information, the server inputs the received layer data to a layer subsequent to a layer indicated by the received layer position information in the server-side inference model and performs processing up to the output layer.

12. An edge device that cooperates with a server to perform computation of an inference model including an input layer, L intermediate layers, and an output layer, the edge device comprising:
   at least one processor; and
      at least one memory having stored thereon instructions which, when executed by the at least one processor, cause the edge device at least to:
   set an edge-side inference model including the input layer and first to n-th intermediate layers among the L intermediate layers;
   communicate data with the server; and
   detect specific information included in an input image input to an input layer of the edge-side inference model, and generate, according to the detected specific information, layer position information indicating a position of a last layer to process the input image in the edge-side inference model,
   wherein the edge device transmits, to the server, layer data that is a computation result obtained when the input image is input to an input layer of the edge-side inference model and processing is performed from the input layer to a layer indicated by the layer position information, and the layer position information.

13. A server that performs computation of an inference model including an input layer, L intermediate layers, and an output layer in cooperation with an edge device in which an edge-side inference model including the input layer and first to n-th (L>n>1) intermediate layers among the L intermediate layers is set, the server comprising:
   at least one processor; and
      at least one memory having stored thereon instructions which, when executed by the at least one processor, cause the inference processing system at least to:
   set a server-side inference model that is the same as the inference model; and
   communicate data with the edge device,
   wherein, when the server receives first intermediate data that is a computation result obtained when an input image is input to the input layer in the edge-side inference model and processing is performed from the input layer to a specific layer at which the input image was processed, and second intermediate data that is a computation result obtained when processing is performed from the input layer to a layer that is deeper than the specific layer by i (≥1), the server inputs the first intermediate data to an intermediate layer at a layer position X (1≤X≤L−i) in the server-side inference model, and acquires third intermediate data that is a computation result of an intermediate layer at a layer position X+i−1 obtained by performing processing from an intermediate layer at the layer position X to the intermediate layer at the layer position X+i−1, when the third intermediate data and the second intermediate data match, the server inputs the computation result to an intermediate data at a layer position X+i, and performs processing from the intermediate layer at the layer position X+i to the output layer, and when the third intermediate data and the second intermediate data do not match, the server repeats processing of acquiring the third intermediate data again after incrementing a value of X by 1 until the third intermediate data acquired again and the computation result match.

14. An edge device that cooperates with a server to perform computation of an inference model including an input layer, L intermediate layers, and an output layer, the edge device comprising:

at least one processor; and
at least one memory having stored thereon instructions which, when executed by the at least one processor, cause the inference processing system at least to:
set an edge-side inference model including the input layer and first to n-th (L>n>1) intermediate layers among the L intermediate layers;
communicate data with the server; and
detect specific information included in an input image input to an input layer of the edge-side inference model, and generate, according to the detected specific information, first layer position information indicating a position of a specific layer that processes the input image in the edge-side inference model, and second layer position information indicating a position of a layer that is deeper than the specific layer by i (≥1),
wherein the edge device inputs the input image to an input layer of the edge-side inference model, and transmits, to the server, first intermediate data that is a computation result obtained by performing processing from the input layer to a layer indicated by the first layer position information, and second intermediate data that is a computation result obtained by performing processing from the input layer to a layer indicated by the second layer position information.

15. A control method for an inference processing system that performs, by a server and an edge device, computation of an inference model including an input layer, L intermediate layers, and an output layer, wherein the method comprises:
setting, by the server, a server-side inference model that is the same as the inference model; and
communicating, by the server, data with the edge device;
setting, by the edge device, an edge-side inference model including the input layer and first to n-th (L>n>1) intermediate layers among the L intermediate layers;
communicating, by the edge device, data with the server; and
detecting, by the edge device, specific information included in an input image input to an input layer of the edge-side inference model, and generating, according to the detected specific information, layer position information indicating a position of a last layer to process the input image in the edge-side inference model;
inputting, in a first input step, the input image to an input layer of the edge-side inference model;
transmitting, from the edge device to the server, layer data that is a computation result obtained by performing processing from the input layer to a layer indicated by the layer position information, and the layer position information;
receiving the layer data and the layer position information at the server;
inputting, in a second input step, the received layer data to a layer subsequent to a layer indicated by the received layer position information in the server-side inference model; and
performing processing from the layer, where the received layer data is input in the second input step, to the output layer.

16. A control method for an inference processing system that performs, by a server and an edge device, computation of an inference model including an input layer, L intermediate layers, and an output layer, wherein the method comprises:
setting, by the server, a server-side inference model that is the same as the inference model; and
communicating, by the server, data with the edge device;
setting, by the edge device, an edge-side inference model including the input layer and first to n-th (L>n>1) intermediate layers among the L intermediate layers;
communicating, by the edge device, data with the server; and
detecting, by the edge device, specific information included in an input image input to an input layer of the edge-side inference model, and generate, according to the detected specific information, first layer position information indicating a position of a specific layer that processes the input image in the edge-side inference model, and second layer position information indicating a position of a layer that is deeper than the specific layer by i (≥1);
inputting the input image to an input layer of the edge-side inference model;
transmitting, from the edge device to the server, first intermediate data that is a computation result obtained by performing processing from the input layer to a layer indicated by the first layer position information, and second intermediate data that is a computation result obtained by performing processing from the input layer to a layer indicated by the second layer position information;
receiving the first intermediate data and the second intermediate data at the server;
inputting the first intermediate data to an intermediate layer at a layer position X (1≤X≤L−i) in the server-side inference model;
acquiring third intermediate data that is a computation result of an intermediate layer at a layer position X+i−1 obtained by performing processing from an intermediate layer at the layer position X to the intermediate layer at the layer position X+i−1 in the server-side inference model;
inputting the second intermediate data to an intermediate data at a layer position X+i in the server-side inference model when the third intermediate data and the second intermediate data match, and performing processing from the intermediate layer at the layer position X+i to the output layer; and repeating processing of acquiring the third intermediate data again after incrementing a value of X by 1 when the third intermediate data and the second intermediate data do not match, until the third intermediate data acquired again and the second intermediate data match.

17. A non-transitory computer-readable storage medium storing a program for causing a computer to execute a control method for an inference processing system, the inference processing system performing, by a server and an edge device, computation of an inference model including an input layer, L intermediate layers, and an output layer, wherein the method comprises:

setting, by the server, a server-side inference model that is the same as the inference model;

communicating, by the server, data with the edge device setting, by the edge device, an edge-side inference model including the input layer and first to n-th (L>n>1) intermediate layers among the L intermediate layers;

communicating, by the edge device, data with the server; and detecting, by the edge device, specific information included in an input image input to an input layer of the edge-side inference model, and generating, according to the detected specific information, layer position information indicating a position of a last layer to process the input image in the edge-side inference model;

inputting, in a first input step, the input image to an input layer of the edge-side inference model;

transmitting, from the edge device to the server, layer data that is a computation result obtained by performing processing from the input layer to a layer indicated by the layer position information, and the layer position information;

receiving the layer data and the layer position information at the server;

inputting, in a second input step the received layer data to a layer subsequent to a layer indicated by the received layer position information in the server-side inference model; and performing processing from the layer, where the received layer data is input in the second input step, to the output layer.

18. A non-transitory computer-readable storage medium storing a program for causing a computer to execute a control method for an inference processing system, the inference processing system performing, by a server and an edge device, computation of an inference model including an input layer, L intermediate layers, and an output layer, wherein the method comprises:

setting, by the server, a server-side inference model that is the same as the inference model; and communicating, by the server, data with the edge device;

setting, by the edge device, an edge-side inference model including the input layer and first to n-th (L>n>1) intermediate layers among the L intermediate layers;

communicating, by the edge device, data with the server; and detecting, by the edge device, specific information included in an input image input to an input layer of the edge-side inference model, and generating, according to the detected specific information, first layer position information indicating a position of a specific layer that processes the input image in the edge-side inference model, and second layer position information indicating a position of a layer that is deeper than the specific layer by i ($\geq 1$);

inputting the input image to an input layer of the edge-side inference model;

transmitting, from the edge device to the server, first intermediate data that is a computation result obtained by performing processing from the input layer to a layer indicated by the first layer position information, and second intermediate data that is a computation result obtained by performing processing from the input layer to a layer indicated by the second layer position information;

receiving the first intermediate data and the second intermediate data at the server;

inputting the first intermediate data to an intermediate layer at a layer position X ($1 \leq X \leq L-i$) in the server-side inference model;

acquiring third intermediate data that is a computation result of an intermediate layer at a layer position X+i−1 obtained by performing processing from an intermediate layer at the layer position X to the intermediate layer at the layer position X+i−1 in the server-side inference model;

inputting the second intermediate data to an intermediate data at a layer position X+i in the server-side inference model when the third intermediate data and the second intermediate data match, and performing processing from the intermediate layer at the layer position X+i to the output layer; and repeating processing of acquiring the third intermediate data again after incrementing a value of X by 1 when the third intermediate data and the second intermediate data do not match, until the third intermediate data acquired again and the second intermediate data match.

\* \* \* \* \*